(12) United States Patent
Gorilovsky et al.

(10) Patent No.: US 11,847,646 B2
(45) Date of Patent: Dec. 19, 2023

(54) SYSTEMS INCLUDING A GATEWAY RECEIVING SENSOR DATA, AND RELATED METHODS

(71) Applicant: WOODENSHARK LLC, Wilmington, DE (US)

(72) Inventors: Dmitry Gorilovsky, Berlin (DE); Aliaksandr Vasilenka, Wilmington, DE (US); Aleksandr Korolkov, Wilmington, DE (US)

(73) Assignee: WOODENSHARK LLC, Wilmington, DE (US)

( * ) Notice: Subject to any disclaimer, the term of this patent is extended or adjusted under 35 U.S.C. 154(b) by 371 days.

(21) Appl. No.: 16/652,477

(22) PCT Filed: Oct. 2, 2018

(86) PCT No.: PCT/US2018/053834
§ 371 (c)(1),
(2) Date: Mar. 31, 2020

(87) PCT Pub. No.: WO2019/070619
PCT Pub. Date: Apr. 11, 2019

(65) Prior Publication Data
US 2020/0273024 A1    Aug. 27, 2020

Related U.S. Application Data

(63) Continuation-in-part of application No. PCT/US2018/037720, filed on Jun. 15, 2018.

(30) Foreign Application Priority Data

Oct. 2, 2017 (GB) ..................................... 1716073

(51) Int. Cl.
*G06Q 50/06* (2012.01)
*G06Q 20/38* (2012.01)
(Continued)

(52) U.S. Cl.
CPC .......... *G06Q 20/389* (2013.01); *G06F 16/27* (2019.01); *G06Q 20/027* (2013.01);
(Continued)

(58) Field of Classification Search
CPC .............................. G06Q 50/06; G06Q 40/00
See application file for complete search history.

(56) References Cited

U.S. PATENT DOCUMENTS 9,752,840 B1    9/2017 Betro
2015/0332283 A1*  11/2015 Witchey ................. G16H 10/60
                                                                    705/3

(Continued)

FOREIGN PATENT DOCUMENTS

WO    2017163220 A1   9/2017

OTHER PUBLICATIONS

International Search Report, dated Jan. 7, 2019, and Written Opinion issued in International Application No. PCT/US2018/053834.

(Continued)

*Primary Examiner* — Patrick McAtee
*Assistant Examiner* — Nakia Leffall-Allen
(74) *Attorney, Agent, or Firm* — Saul Ewing LLP

(57) ABSTRACT

A system including a data storage server, a service provider's server, and a gateway including a transceiver configured to operate at a power level below 5.0 mW, the data storage server generates first tokens, receives a registration from the service provider's server, and issues first tokens to the service provider's server, and receives a first token from the service provider's server. The data storage server receives sensor data from the gateway, the gateway executes the application to receive the sensor data from sensors, and the data storage server issues second tokens to the gateway after (Continued)

receiving the sensor data from the gateway and stores the received sensor data on the data storage or service provider's server.

20 Claims, 13 Drawing Sheets

(51) Int. Cl.
| | |
|---|---|
| *H04W 4/38* | (2018.01) |
| *G06F 16/27* | (2019.01) |
| *G07C 9/38* | (2020.01) |
| *G06Q 20/02* | (2012.01) |
| *G06Q 20/06* | (2012.01) |
| *G06Q 20/08* | (2012.01) |
| *G06Q 30/04* | (2012.01) |
| *G06Q 50/30* | (2012.01) |
| *H04L 67/125* | (2022.01) |
| *H04W 4/021* | (2018.01) |
| *H04W 12/037* | (2021.01) |

(52) U.S. Cl.
CPC ....... *G06Q 20/0655* (2013.01); *G06Q 20/085* (2013.01); *G06Q 30/04* (2013.01); *G06Q 50/06* (2013.01); *G06Q 50/30* (2013.01); *G07C 9/38* (2020.01); *H04L 67/125* (2013.01); *H04W 4/021* (2013.01); *H04W 4/38* (2018.02); *H04W 12/037* (2021.01); *G06Q 2220/00* (2013.01)

(56) References Cited

U.S. PATENT DOCUMENTS

| | | | |
|---|---|---|---|
| 2017/0055156 A1* | 2/2017 | Myers | H04W 12/50 |
| 2017/0083989 A1* | 3/2017 | Brockman | G06Q 50/06 |
| 2017/0103167 A1* | 4/2017 | Shah | G06Q 10/101 |
| 2017/0232300 A1* | 8/2017 | Tran | G16H 20/30 434/247 |
| 2017/0358041 A1* | 12/2017 | Forbes, Jr. | B60L 53/64 |
| 2019/0327082 A1* | 10/2019 | Ow | H04L 9/0637 |

OTHER PUBLICATIONS

Ozyilmaz, K., et al., "Designing a blockchain-based IoT infrastructure with Ethereum, Swarm and LoRa", arxiv.org, Cornell University Library, 201 Olin Library Cornell University Ithaca, NY 14853, Sep. 20, 2018 (Sep. 20, 2018), pp. 1-6.

Ozyilmaz, Kazim, et al., "IDMOB: IoT Data Marketplace on Blockchain", arxiv.org, Cornell University Library, 201 Olin Library Cornell University Ithaca, NY 14853, Sep. 30, 2018 (Sep. 30, 2018), pp. 1-9.

Shafagh, H., et al., "Towards Blockchain-based Auditable Storage and Sharing of IoT Data", arxiv.org, Cornell University Library, 201 Olin Library Cornell University Ithaca, NY 14853, Nov. 14, 2017 (Nov. 14, 2017).

Zyskind, et al., "Decentralizing Privacy: Using Blockchain to Protect Personal Data", 2015 IEEE Security and Privacy Workshops, May 1, 2015 (May 1, 2015), pp. 180-184, ISBN: 978-1-4799-9933-0.

* cited by examiner

Storage conditions control

End-to-end visibility into delivery process

Predictive maintenance

Inventory tracking & analytics

Smart labels

Optimized warehouse workloads

Real-time fleet management

Cargo integrity monitoring

SYSTEMS INCLUDING A GATEWAY RECEIVING SENSOR DATA, AND RELATED METHODS

CROSS REFERENCE TO RELATED APPLICATIONS

This application claims the priority of PCT/US2018/053834, filed on Oct. 2, 2018, which is a continuation-in-part of International Application No. PCT/US2018/037720, filed on Jun. 15, 2018, and claims priority to GB Application No. GB1716073.0, filed on Oct. 2, 2017, the entire contents of each of which being fully incorporated herein by reference.

BACKGROUND OF THE INVENTION

1. Field of the Invention

The field of the invention relates to systems including a gateway receiving sensor data, and to related methods.

2. Technical Background

At the present time, the world contains billions of devices with connectivity which gather sensor data. It would be possible to gather up that data in a particular location, and to store that data, and then to analyze the stored data to obtain results which cannot otherwise be obtained. However, a major obstacle is that users of devices with connectivity, or the providers of services used by the devices with connectivity, are reluctant, or unwilling, to provide sensor data from the devices with connectivity, because the users or providers are worried about the security of the sensor data after they have provided it. Another worry may be that if the users or providers are promised some payment for providing the data, the payment may not be provided, or incorrect logging of the amount of sensor data provided may mean that the payment is less than it should have been. Another problem is that the collection of large amounts of sensor data may require unacceptable amounts of energy use, for example if many long distance wireless data links need to be used for a large amount of time.

Accordingly, there is a need for a system in which users of devices with connectivity, or the providers of services used by the devices with connectivity, can provide sensor data from the devices with connectivity, using low amounts of energy, with confidence in the security of the sensor data after the users or providers have provided it, and with confidence that if the users or providers are promised some payment or reward for providing the sensor data, the payment or reward will be provided, and that correct logging of the amount of data provided will mean that the payment amount, or the reward, is correct.

3. Discussion of Related Art

EP2741468A1 and EP2741468B1 each discloses a user data annotation method, a terminal device, and a server. The method includes: receiving, by a server, location information of a first user corresponding to a first terminal device, behavior information of the first user, and sensor data of each sensor on the first terminal device, which are sent by the first terminal device in a process of a game; and annotating, by the server, the location information of the first user, the behavior information of the first user, and the sensor data to obtain annotation data of the first user. The technical disclosure can increase the amount of annotation data and overcome the limitation on the application of user behavior recognition.

EP2670108A1 and EP2670108B1 each discloses a pluggable module, which module is configured to be connected into a pluggable port of a radio base station. The pluggable module is associated with at least one sensor for collecting external sensor data. The pluggable module comprises at least one communication interface, a processor and a memory for storing software comprising computer program code which, when run in the processor, causes the pluggable module to collect pre-specified external sensor data from at least one sensor associated with the pluggable module and communicate the collected external sensor data to a centralized server via the at least one communication interface.

SUMMARY OF THE INVENTION

According to a first aspect of the invention, there is provided a system including a data storage server, a service provider's server, and a gateway including a transceiver configured to operate at a power level below 5.0 mW, the gateway programmed with an application, the service provider's server in communication with the data storage server, and the gateway in communication with the data storage server,
  wherein the data storage server is configured to generate first tokens, to receive a registration from the service provider's server, and to issue first tokens to the service provider's server, and to receive a first token from the service provider's server,
  wherein the data storage server is configured to receive sensor data from the gateway, the gateway executing the application to receive the sensor data from a sensor, or from a plurality of sensors, via the transceiver, the data storage server configured to issue second tokens to the gateway after receiving the sensor data from the gateway,
  the data storage server further configured to store the received sensor data on the data storage server or to store the received sensor data on the service provider's server, wherein token transactions for the first tokens and for the second tokens are stored in the system. For example, Bluetooth Class 2, Bluetooth Class 3 and Bluetooth Class 4 transceivers all operate at a power level below 5.0 mW.

An advantage is that the system is arranged to harvest sensor data and to log the harvesting of the sensor data, using low amounts of energy, which enables energy efficient harvesting of large amounts of sensor data.

The system may be one wherein the sensor data is stored using a blockchain system, wherein the token transactions for the first tokens and for the second tokens are stored using the blockchain system, and wherein the data storage server, the service provider's server, and the gateway are registered nodes in the blockchain system. An advantage is that sensor data is stored securely, because it is stored using the blockchain system. An advantage is that token transactions are stored securely, because they are stored using the blockchain system. An advantage is that sensor data and transaction data are securely stored in the same blockchain system, which means that transactions are very reliably associated with respective sensor data storage activities.

The system may be one in which the transceiver is configured to operate at a power level below 3.0 mW. An advantage is improved energy efficiency of harvesting of sensor data.

The system may be one in which the transceiver is configured to operate at a power level below 1.0 mW. An advantage is improved energy efficiency of harvesting of sensor data.

The system may be one in which the transceiver is a Bluetooth transceiver. An advantage is operability with a wide range of sensors.

The system may be one in which the gateway is a mobile computing device. An advantage is that the gateway may collect sensor data as it moves.

The system may be one in which the mobile computing device is a smartphone, a tablet computer or a laptop computer. An advantage is that the gateway provides a broad functionality.

The system may be one in which the gateway is a non-mobile device.

The system may be one in which the gateway is configured to use Bluetooth mesh networking. An advantage is the ability to collect more sensor data.

The system may be one in which the gateway includes a further transceiver.

The system may be one in which the further transceiver is configured to operate at a power level above 50 mW. An advantage is the ability to send the data further than is possible using the transceiver.

The system may be one in which the gateway is configured to communicate with the data storage server using the further transceiver.

The system may be one in which the further transceiver is a cellular transceiver, for example a LPWAN transceiver.

The system may be one in which the transceiver is configured to use advertising (beacon) one way communication from a sensor to the gateway.

The system may be one in which the transceiver is configured to use a mesh Bluetooth protocol. An advantage is the ability to collect more sensor data.

The system may be one in which the system includes a sensor.

The system may be one in which the sensor sends a beacon advertising signal when it is not connected to the gateway; the gateway's application sets up a geofence zone to all low power (below 5.0 mW) sensors, so the gateway runs a part of the application code each time when the gateway enters a sensor advertising signal zone; this part of the code is responsible for data routing—so the gateway connects to the sensor, downloads the sensor data and sends the sensor data to the destination (eg. in the cloud).

The system may be one in which the transceiver is configured to use two-way communication between the sensor which is trusted by the gateway, and the gateway, which is trusted by the sensor.

The system may be one in which the sensor includes an ID relating to the system.

The system may be one in which the gateway checks the ID against a ledger of the system, wherein the system includes the ledger.

The system may be one in which the gateway checks a secure key in the gateway's internal memory, and all data sent through the gateway is end-to-end encrypted.

The system may be one in which a user can't read the data until he has necessary key for the sensor.

The system may be one in which a sensor key is used for correct accounting of a sent data amount.

The system may be one in which multiple Bluetooth sensors are connectable to multiple gateways, acting as gateways to the sensor data destination.

The system may be one including Bluetooth sensors which include sensors in one or more of: Utility meters; Parking sensors; Water/gas leak detectors; Gunshot detectors; Air quality sensors; weather sensors; Attendance counters; Panic buttons; Public transportation trackers; Street lights; traffic lights; Home & office security sensors; Asset trackers; electricity meters; sun light/radiation meters; vibration sensors.

The system may be one in which the system includes multiple LPWAN gateways, and multiple LPWAN sensors connectable to the multiple LPWAN gateways.

The system may be one in which there is no need to pair a specific sensor with a specific gateway.

The system may be one in which storage of sensor data is recorded within a common ledger, creating a transparent billing.

The system may be one in which the tokens are cryptotokens.

The system may be one in which the system provides interoperable and transparent connectivity for cities, individual households and major enterprises alike.

The system may be one including a plurality of gateways, the plurality of gateways in communication with the data storage server, each gateway including a transceiver configured to operate at a power level below 5.0 mW, each gateway programmed with an application, wherein the data storage server is configured to receive sensor data from the gateways, each gateway executing the respective application to receive the sensor data via the respective transceiver, the data storage server configured to issue second tokens to the gateways after receiving the sensor data from the gateways, the data storage server further configured to store the received sensor data on the data storage server or to store the received sensor data on the service provider's server, wherein token transactions for the first tokens and for the second tokens are stored in the system. An advantage is that many gateways can be used to gather sensor data. An advantage is that the system provides for many gateways to receive second tokens, in relation to sending sensor data to the data storage server.

The system may be one in which the transceivers are configured to operate at a power level below 3.0 mW. An advantage is improved energy efficiency of harvesting of sensor data.

The system may be one in which the transceivers are configured to operate at a power level below 1.0 mW. An advantage is improved energy efficiency of harvesting of sensor data.

The system may be one wherein the sensor data is stored using the blockchain system, wherein token transactions for the first tokens and for the second tokens are stored using the blockchain system, and wherein the gateways are registered nodes in the blockchain system. An advantage is that sensor data gathered by the gateways and transaction data associated with the gateways are securely stored in the same blockchain system, which means that for the gateways, transactions are very reliably associated with respective sensor data storage activities.

The system may be one in which the plurality of gateways include a plurality of LR gateways and a plurality of BLE gateways. An advantage is that sensor data may be received by both short range connection, and by longer range connection, which covers a broad range of connection distances.

The system may be one in which the gateways are arranged to receive the sensor data from a plurality of devices registered at the service provider's server. An advantage is that sensor data may be received from many devices.

The system may be one in which the system includes a plurality of service providers' servers, the service providers' servers in communication with the data storage server, wherein the data storage server is configured to generate first tokens, to receive registrations from the service providers' servers, and to issue first tokens to the service providers' servers, and to receive first tokens from the service providers' servers, wherein token transactions for the first tokens are stored using the blockchain system, and wherein the service providers' servers are registered nodes in the blockchain system. An advantage is that sensor data relating to service providers' servers and transaction data associated with the service providers' servers are securely stored in the same blockchain system, which means that for the service providers' servers, transactions are very reliably associated with respective sensor data storage activities.

According to a second aspect of the invention, there is provided a method of storing transactions and sensor data acquired using a transceiver configured to operate at a power level below 5.0 mW, in a system, the system including a data storage server, a service provider's server, and a gateway, the gateway including the transceiver configured to operate at a power level below 5.0 mW, the gateway programmed with an application, the service provider's server in communication with the data storage server, and the gateway in communication with the data storage server, the method including the steps of:

(i) the data storage server generating first tokens;
(ii) the data storage server receiving a registration from the service provider's server, and issuing first tokens to the service provider's server, and receiving a first token from the service provider's server;
(iii) the gateway executing the application to receive sensor data from a sensor, or from a plurality of sensors, via the transceiver which is configured to operate at a power level below 5.0 mW;
(iv) the data storage server receiving the sensor data from the gateway;
(v) the data storage server issuing second tokens to the gateway after receiving the sensor data from the gateway;
(vi) the data storage server storing the received sensor data on the data storage server or storing the received sensor data on the service provider's server, and
(vii) storing token transactions for the first tokens and for the second tokens in the system.

The method may be one including the step of using a system of any aspect of the first aspect of the invention.

BRIEF DESCRIPTION OF THE FIGURES

Aspects of the invention will now be described, by way of example(s), with reference to the following Figures, in which.

DETAILED DESCRIPTION

Figure 1:
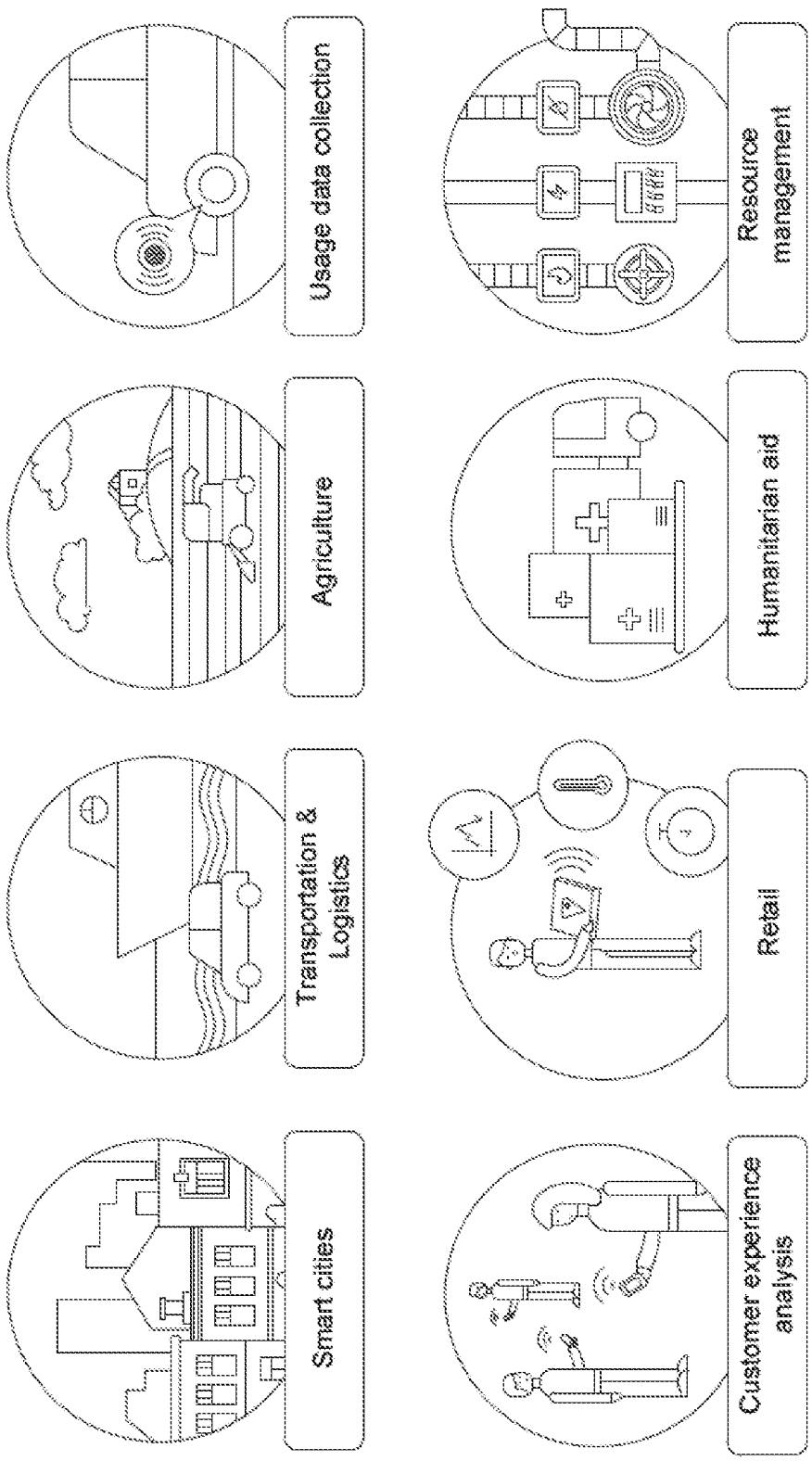
FIG. 1 shows examples of application areas.

Blockchain-Based Unified Security Protocol for Machine-to-Machine (M2M) Communications Brief Description:

Smartphone and personal computer (PC) users today are subscribed to a number of services (e.g. security services), a lot of them operating on a subscription basis. They include: health monitoring, smartphone and PC security apps, parental control systems and home/business security. The proposed system, in an example, provides a 3-layer server structure to unify the data from all the services under a singular account and provides an internal environment for secure data exchange service along with billing using cryptocurrency.

System Structure:

In an example, the system is based around a concept of cryptocurrency and blockchain storage. An environment is created for a free (e.g. Ethereum or similar) blockchain based token circulation for two types of tokens:

1. Producer tokens—a one-time emitted tokens for the service providers. They are purchased by the companies that own different applications (e.g. security applications) and hardware, to participate in the system.
2. End-user tokens—these are a substitute of dollar-value subscription. They are tied both to the decentralized environment of the proposed system and a dollar value of the transaction payment. These tokens can have emission on the basis of low availability.

Crypto tokens use a circulation system known as blockchain. A blockchain is a public ledger of all token transactions that have ever been executed. It is constantly growing as 'completed' blocks are added to it with a new set of recordings. The blocks are added to the blockchain in a linear, chronological order.

In an example, each node (e.g. a computer connected to the system network using a client that performs the task of validating and relaying transactions) eventually gets a full copy of the blockchain, which gets downloaded automatically upon joining the network. The blockchain has complete information about the addresses and their balances, right from the genesis block to the most recently completed block.

In an example, a typical operation cycle includes a computing node, a server, a device transmitting the data and a sensor that produces the data. A security device transfers the data to our system via a first layer service. The data gets aggregated and is transferred to the common environment via the second layer. After that, the data is stored via a blockchain system. In an example implementation, a singular token serves as a transaction confirmation and is used to perform one transaction. Blockchain ensures every transaction is unique and secure. After the data transfer is complete there is no way of falsifying the information.

In an example, the first development stage is an ICO (initial coin offering). During this stage the service provides companies the possibility to purchase the tokens to participate in the system. In an example, the companies are allowed to purchase 20% of all tokens available; the remaining 80% are held within the system control program to be distributed with the growth of the number of companies involved. Companies that purchased a significant amount of the tokens may become members of the controlling committee—a group that can put proposed changes to influence tariffs within the system.

In an example, end-user tokens are continuously released as needed—they are reusable and serve as a form of payment to the providers. Providers in turn are able to sell them to each other and users along with exchanging them into traditional currencies.

In an example, the system can sustain itself in both cases of additional emission and no additional emission. A decision regarding additional emission must be made within the operational cycle. With development of the system, more and more companies are expected to join the system. With every company joining, a single provider token value rises as they become limited and can only be replenished by the system's server.

Companies owning a large number of tokens may be included into a managing committee. This committee is the only governing body of the system. It represents the community and can act through committee decisions.

Decisions made by the committee include but are not limited to:
1. Additional emission
2. Decisions regarding the community interests
3. Blockchain usage and boundaries This way, a user remains in control. This decentralized concept provides users with rights to their own private information on security. After being uploaded to blockchain, a user's data is unfalsifiable. The data is secure and accessible by this user only. Every decision on using this information by two services or sharing it in any way is made by the user, not any operational service or third-party company.

Usual users are able to voice their interest and concerns to the committee, triggering proposals on any issue they might have.

IoT Connectivity Platform, e.g. Global IoT Connectivity Platform

In an example, the platform is a blockchain-powered platform to make many things connected. The platform is a blockchain-powered decentralized platform on top of multiple internet of things (IoT) connectivity solutions.

In an example, the platform is built to become a Domain Name System (DNS) of things—a platform integrating various connectivity standards and connecting (e.g. billions of) devices across the globe. The platform uses crowdsourcing to gain coverage and help businesses effortlessly adopt IoT technology in a most cost-effective way. The platform enhances the growth of the global IoT network coverage by bringing together vendors and users, gateway owners and devices.

Benefits for IoT Market

The Platform Makes it Easy to Globally Expand Existing IoT Businesses

There is no need to negotiate with networks all over the world to expand geographically. Manufacturers can sell devices worldwide. Businesses and integrators can scale successful local cases to the global market.

The Platform Makes it Easy to Integrate IoT to Any Business

In an example, all devices will automatically be connected to the network if they are in the platform's ledger. In an example, all devices will automatically be connected to the network if they are in the platform's ledger, and if they are prepaid; if a device is not prepaid—it is not connected to the network: a gateway will not harvest the data from it. Companies won't need to negotiate with connectivity providers or deploy a new network if they want to deploy new sensors.

In an Example, the Platform Unlocks New IoT Application Areas

In an example, Low-Power Wide-Area Network (LP-WAN) and Bluetooth connectivity with worldwide coverage enable integration of sensors in day to day products. With these two technologies, companies can use sensors with low cost of a chip and a long battery lifetime.

The Platform Provides Businesses with an Ability to Collect New Types of Data

In an example, the platform Bluetooth Low Energy (BLE) may use customers' smartphones as mobile gateways. This creates an opportunity for business to collect more data about customer offline behavior. Bluetooth Low Energy (Bluetooth LE, colloquially BLE, formerly marketed as Bluetooth Smart) is a wireless personal area network technology designed and marketed by the Bluetooth Special Interest Group (Bluetooth SIG) aimed at novel applications in the healthcare, fitness, beacons, security, and home entertainment industries. Compared to Classic Bluetooth, Bluetooth Low Energy is intended to provide considerably reduced power consumption and cost while maintaining a similar communication range.

Examples of Application Areas for the platform are: Smart cities; Agriculture; Usage data collection; Retail; Resource management; Transportation & Logistics; Customer experience analysis, and Humanitarian aid. Examples of Application Areas are shown in FIG. 1.

Example Use Case: Transportation & Logistics

Package Delivery Tracking

Delivery businesses can provide clients with an accessible service of controlling a cargo delivery at all stages of a journey. The platform may provide logistics companies with worldwide LPWAN and Bluetooth connectivity. LPWAN and Bluetooth sensors are cost-effective and have a long battery life. Placing these sensors within the packages requires no alteration of the delivery process and improves the quality of service simultaneously providing the company with logistics insights.

End-to-End Visibility Into Delivery Processes.

Decreased delivery time and improved transportation efficiency are provided, by tracking products «from supplier to client», e.g. from a supplier to a client. Granular data may be collected, such as: Time spent in stock; Time spent in delivery; Time to shelf.

Transportation & Logistics

Example Use Case: Construction Management & Buildings Maintenance

Construction and management companies may be able to seamlessly implement IoT solutions on construction sites or constructed buildings. Sensors connected to the platform can be installed seamlessly. Companies could just place sensors where they need them. There is no need to deploy a network for them. All devices may automatically be connected to the network if they are in the platform's ledger. Construction and management companies can, for example:
  (i) control the closure/opening of manholes, attics, stairwell spaces in an apartment in constructed buildings;
  (ii) control noise level and implement automated closed-circuit television (CCTV) solutions on the buildings under construction.

Example Use Case: Retail

Globalizing IoT Solution

Companies that have successful local cases can scale them worldwide. The platform is roaming-free and in an example there is no need to update device's firmware, so companies won't have additional costs in moving to other regions. It can be beneficial for any type of IoT, for example, a manufacturer of a carbonated beverages refrigeration monitoring equipment. A manufacturer could integrate temperature sensor & opening/closing counter and provide clients with information from these sensors.

Example Use Case: Infrastructure Sharing

The platform provides current infrastructure players with the opportunity to earn extra revenue from an existing network. Infrastructure players can share an existing network with others and get benefits from using other players' networks. Wide coverage provides an opportunity to propose a new IoT solution to existing clients. Using other players' networks also cuts network development costs.

Benefits

The platform may provide Smart Cities with:
  (i) seamless infrastructure deployment:
  Cities can easily deploy a network and then expand coverage when it is needed.
  (ii) cost-effective connectivity solution
    The platform's LR (long range network) can provide a city-wide coverage with only a few gateways.
    Cities can have a city-wide platform BLE coverage without actually investing in infrastructure.
  (iii) easy integration
  Cities can seamlessly integrate new IoT solutions. When a new device or sensor is added to the platform's ledger, it is automatically provided with network access.

Figure 4:
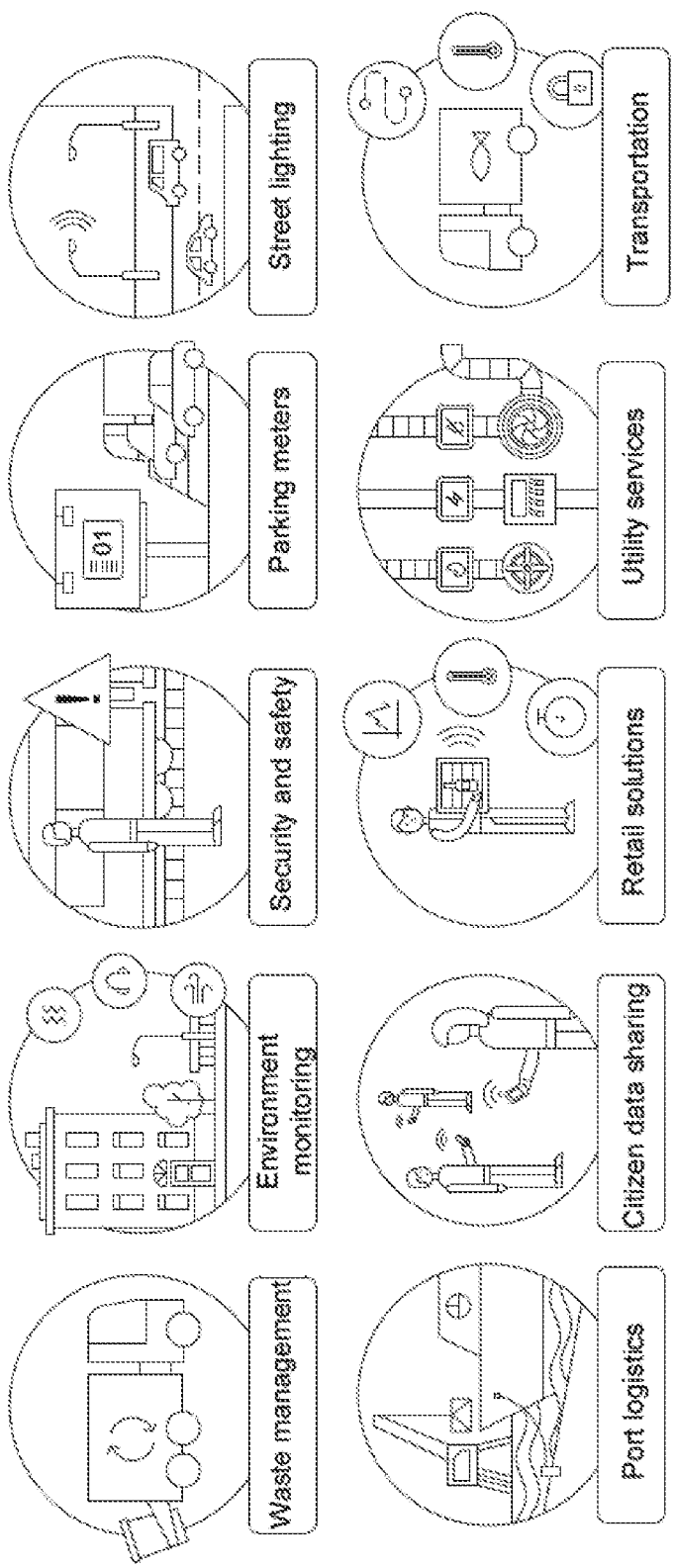
FIG. 4 shows example application areas.

Example application areas include: Environment monitoring; Security and safety; Parking meters; Street lighting; Retail solutions; Utility services; Transportation; Waste management; Port logistics; Citizen data sharing. Example application areas are shown in FIG. 4.

Example Use Case: Waste Management

Monitoring the waste collection in different parts of the city can help manage collection routes. In an example, sensors can be placed to obtain real-time information on how full public bins are. In an example, sensors can be placed to collect real-time information on how full public bins are, but the information may not be transferred to end users in real time. This data allows for enhanced efficiency of trash collection routes.

Example Use Case: Wastewater Management

Many cities face severe problems with water supply and management. Cities can reduce water loss by managing outdoor usage. This is done through installing sensors tracking rainfall, humidity, soil composition, topography, temperature, and sunlight. Coupling this data with information about the landscape and weather prediction enables the possibility to make smarter decisions about irrigation. Acquiring data on water levels in pipes can reduce the amount lost to leakage and prevent new leaks. Water pressure can be controlled by embedding sensors in water pipes throughout the distribution network and connecting them to pump control systems.

Example Use Case: Energy

Energy saving solutions is one of the most well-established IoT applications. Energy management systems rely on smart meters, which relay information about lights and buildings energy usage back to a central management system in order to efficiently allocate resources. This data also can be used to identify and address outages.

Example Use Case: Environmental Conditions

A city can install sensors on lampposts to monitor environmental conditions including temperature, noise, and air quality. This data can be used to manage accidents, identify patterns in microclimates, and make predictions about vehicle and pedestrian traffic conditions. Moreover, these data sets can be available to the public, allowing citizens to take partial community ownership in tracking and responding to local environmental issues.

Example Use Case: Parking

Another common IoT application is tracking the availability of parking spaces. Searching for a parking spot in a big city is frustrating for the drivers and creates traffic jams. A city can use sensors to determine if a parking space is available or not. This data can be sent directly to drivers via an application helping to guide the driver quicker to an available spot. This information is also valuable to the city administration branch making decisions on parking system changes.

An Example of how we do it
  1) The platform integrates with existing IoT networks into one (e.g. uniform) virtual network and allows deployment of new networks quickly and seamlessly using crowdsourcing.
  2) All devices will automatically be connected to the network if they are in the platform's ledger. Companies won't need to negotiate with connectivity providers or deploy an own network if they want to deploy new sensors.
  3) The platform provides networks and gate owners with extra revenue. We distribute revenue for data transfer between all gate owners, e.g. based on the number of connections completed through their gateways.

Platform Architecture Overview

The platform's software may act as a middleware between gateways and sensor owners. We make sure that data is being delivered to the right destination and everyone is paid.

In an example, Vendor X makes available for use a plurality of consumer devices. The plurality of consumer devices provides data (e.g. sensor data), which is transmitted to a Gate Pool, which includes a plurality of LR gateways and a plurality of BLE gateways. The Gate Pool forwards the data to platform Master Nodes for verification. Within the Master Nodes, which are connected to each other, a Vendor X node performs activities such as transport recordation, invoice generation, billing generation and data storage. After verification, if the Master Nodes approve, approval is sent back to the Gate Pool, and data is sent to, for example, a user web service, a user app, a vendor analytic tool, or to vendor software, and the transactions are recorded using a blockchain.

Figure 2:
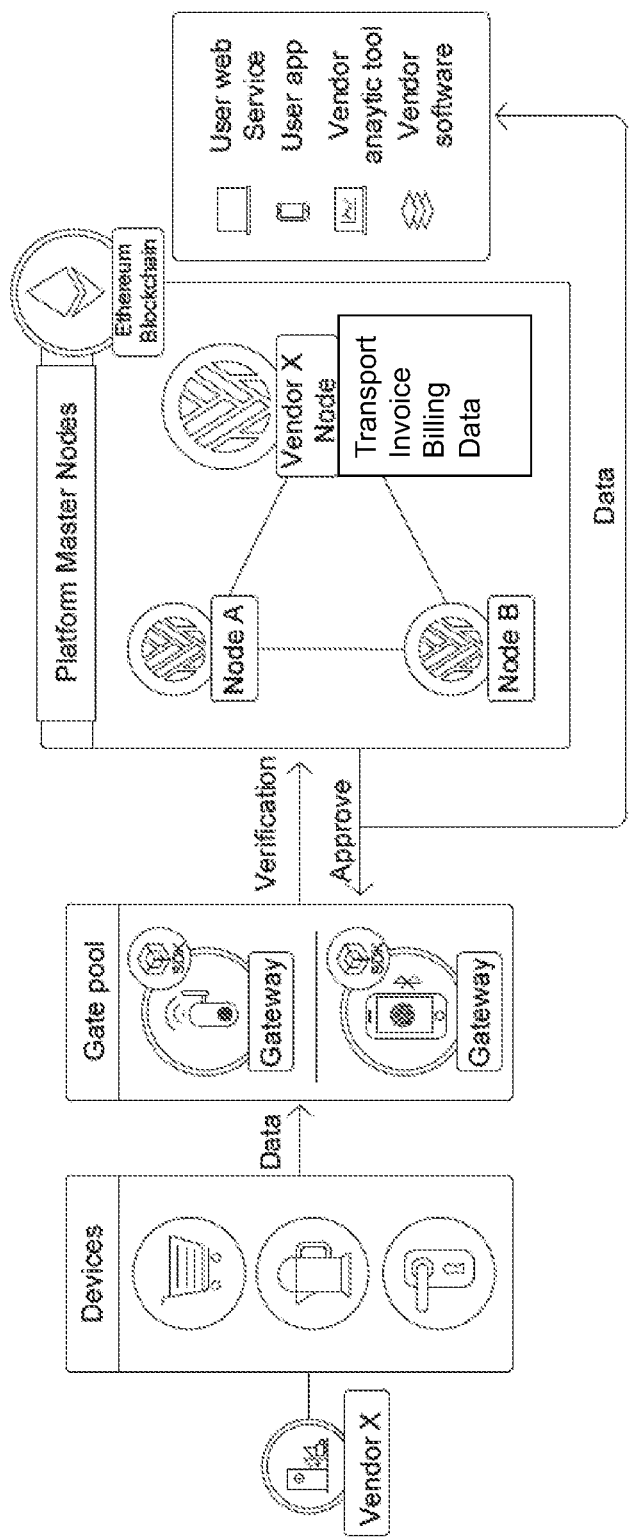
FIG. 2 shows an example in which Vendor X makes available for use a plurality of consumer devices. The plurality of consumer devices provides data (e.g. sensor data), which is transmitted to a Gate Pool, which includes a LR gateway and BLE gateway. The Gate Pool forwards the data to platform Master Nodes for verification. Within the Master Nodes, which are connected to each other, a Vendor X node performs activities of transport recordation, invoice generation, billing generation and data storage. After verification, if the Master Nodes approve, approval is sent back to the Gate Pool, and data is sent to a user web service, a user app, a vendor analytic tool, or to vendor software, and the transactions are recorded using a blockchain.

An example is shown in FIG. 2.

In an example, sensors in consumer devices send sensor data via BLE to a user smartphone; the user smartphone then transmits the sensor data to a platform. And sensors in other consumer devices send sensor data via LoRaWAN to a user gateway; the user gateway then transmits the sensor data to a platform.

The platform may be designed to be protocol agnostic, for example it may work over Bluetooth as well as LoRa or any other data transmission protocol.

Figure 5:
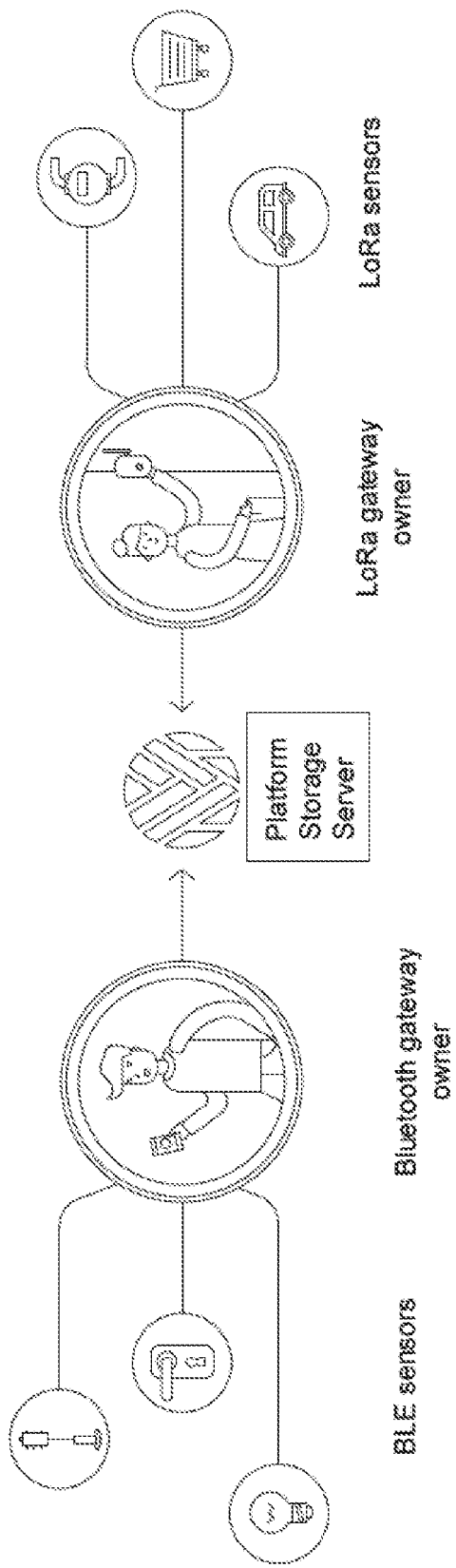
FIG. 5 shows an example in which sensors in consumer devices send sensor data via BLE to a user smartphone; the user smartphone then transmits the sensor data to a platform. And sensors in other consumer devices send sensor data via LoRaWAN to a user gateway; the user gateway then transmits the sensor data to a platform.

An example is shown in FIG. 5.

Billing and Payouts with the Platform

Gateway Owners Get Payment for Each Connection Made Through their Gateway

Manufacturers release devices and add their IDs to the platform's ledger. Gateway owners provide network access for those devices and check their IDs against the platform's ledger. Manufacturers cover the platform's bills issued by participating gateways. The platform pays networks or gateway owners for their services.

In an example, a Vendor with an ID obtained by registration with a platform makes available consumer devices. The Vendor pays by sending platform tokens to a bounty pool on the platform. Those consumer devices are used by users. Those consumer devices generate data, which is sent to gateways that are operated by gateway owners. The gateway owners provide received data to the platform. Billing is done by a masternodes. Gateway may complain if they were billed incorrectly. The gateway owners receive tokens from the platform bounty pool, in response to the invoices issued from the gateways to the vendors.

In an example, there are provided the following transport and billing cycles in the system:
1. Transport downlink cycle
a. User generates data
b. Gateway transfers data to the platform Master nodes
2. Transport uplink cycle
a. Vendor servers sends data to the platform Master nodes
b. The platform Master nodes keeps the uplink data
c. Gateways looks for uplink data
d. Gateway sends uplink data to a Vendor's devices
3. Billing cycle
a. At intervals, for example each two weeks, the platform Master nodes are generating invoices from Gateway Owners to Vendors on behalf of transport service that has been provided.
b. Each Vendor is paying each invoice in platform tokens.
c. In accordance with the invoices, all tokens are collected in bounty pool.
d. After billing cycle is complete, Gateway Owners are paid for their data transport services from bounty pool in accordance with the invoices and in accordance with the the confirmation of existence of the data transport services. For example, if a gateway was online 80 hours during last billing cycle, but did not transfer any data, it will receive a payment for the fact of being online.

Figure 3:
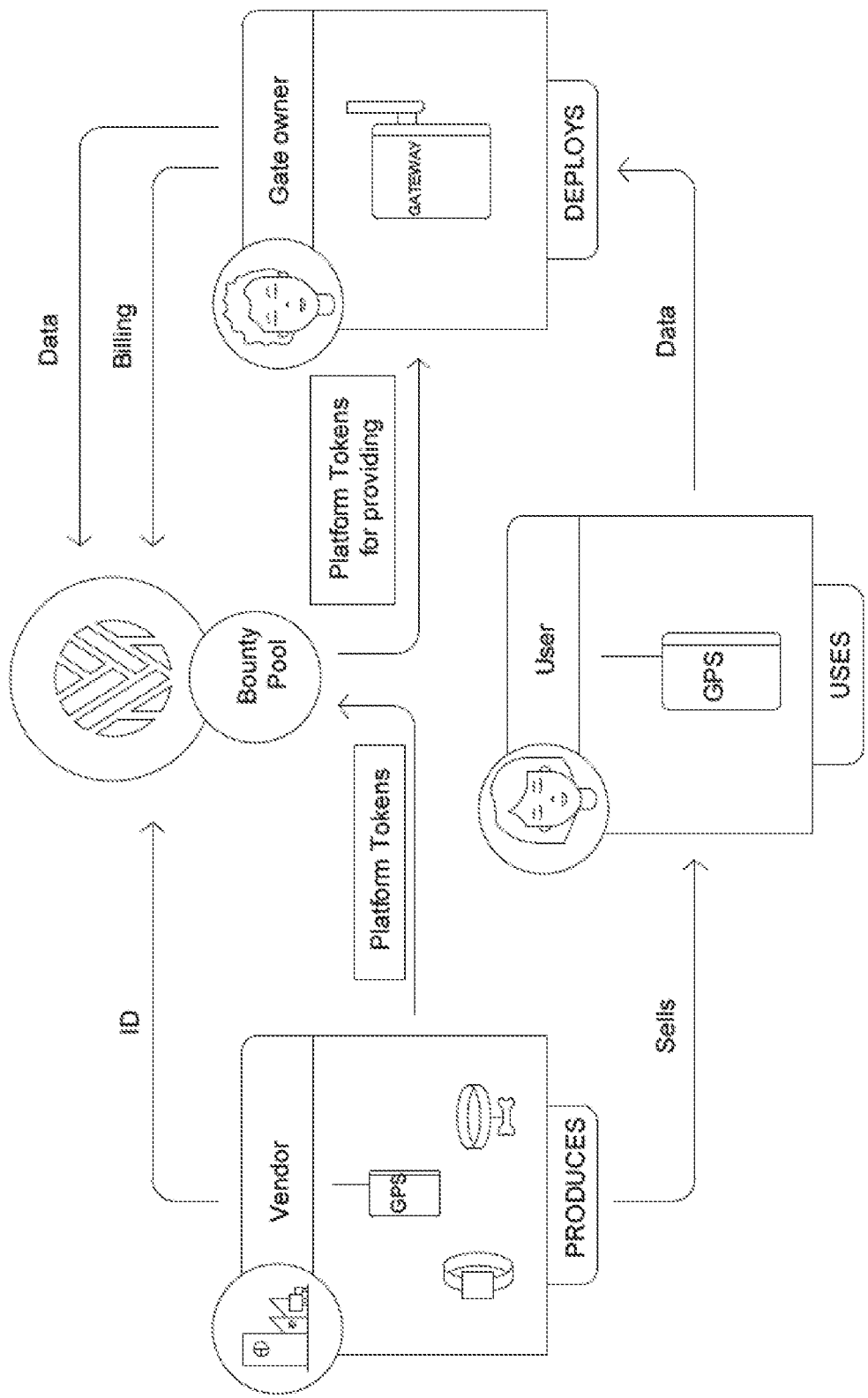
FIG. 3 shows an example in which a Vendor with an ID obtained by registration with a platform makes available consumer devices. The Vendor pays by sending platform tokens to a bounty pool on the platform. Those consumer devices are used by users. Those consumer devices generate data, which is sent to a gateway that is operated by a gateway owner. The gateway owner provides received data to the platform. Billing is done by a masternodes (not shown). The gateway owner receives tokens from the platform bounty pool, in response to the invoices sent from the gateway to the vendor.

An example is shown in FIG. 3.

Why Blockchain?

We use blockchain in order to exploit crowdsourcing. A blockchain technology is designed to build decentralized services.

Blockchain technology enables us to build the decentralized network. No one owns this network and even the platform itself can't influence it directly.

Blockchain lets us cut costs. There are no administrative, infrastructure, service maintenance or setup costs.

Blockchain provides an out-of-the-box transparent billing system.

Blockchain can utilize decentralized storage solutions. All the data on the transactions is shared by all members.

Blockchain allows for a permissionless platform state. The platform brings together existing networks and newly installed gateways. Anyone can become a part of the platform's network—data from the sensors can be transferred using any smartphone or compatible gateway.

In an Example, One Blockchain is Not Enough

A Transaction blockchain (e.g Exonum based) logs all data connections and data transfers.

A Billing blockchain (e.g. Ethereum based) issues invoices based on the information from the Transaction blockchain. The Billing blockchain:
processes and logs all payments
approves token payments to gateway owners.

A Master node approves subsequent data connections between devices and vendor networks.

Connectivity Solutions

The platform implements the platform's LR and the platform's BLE solutions: in an example, combining them together makes for a complete data gathering solution covering entire businesses even across multiple countries.

The platform launches with the platform's LR and the platform's BLE (e.g. as kits) and will later include support for other connectivity solutions, increasing the number of devices served.

The platform's LR is based on LoRaWAN, in an example. It is most suitable for industrial and business applications where speed and reliability are critical. LoRaWAN is a media access control (MAC) layer protocol for managing communication between LPWAN gateways and end-node devices, maintained by the LoRa Alliance.

The platform's LR is based on LoRaWAN technology designed for long range communications. The platform brings together existing LPWAN networks and incentivizes private gateway owners who can join the platform's network. Any gateway could be added to the network and start transferring data from the platform's sensors instantly without any technical setup.

The platform's BLE is based on Bluetooth Low Energy. With customer smartphones acting as mobile gateways, it is most suitable for noncritical consumer and big data applications, such as collecting large amounts of data for later analysis.

The platform's BLE network is based on Bluetooth Low Energy technology and uses the smartphones (e.g. of regular citizens) as BLE gateways. With a mobile APP with the platform's software development kit (SDK), any smartphone can transfer data from the smartphone when connected to platform sensors without requiring additional action from a smartphone's user.

The Platform's Solutions Characteristics

The Platform's LR

Long battery life—more than 3-50 times lifetime advantage over a GSM/3G/4G network. Low cost of the sensors—$5-$15 per sensor. Easy to cover big distances—extended efficiency, and wide cell radius (up to 15 km), no need to deploy a lot of cells to cover a big territory. Data collection cost close to 0 if you have your own gateways.

The Platform's BLE

Long battery life—1-5 years, depends on the specific use case. Low cost of the sensors—$3-$10 per sensor. Very low data collection cost.

Figure 6:
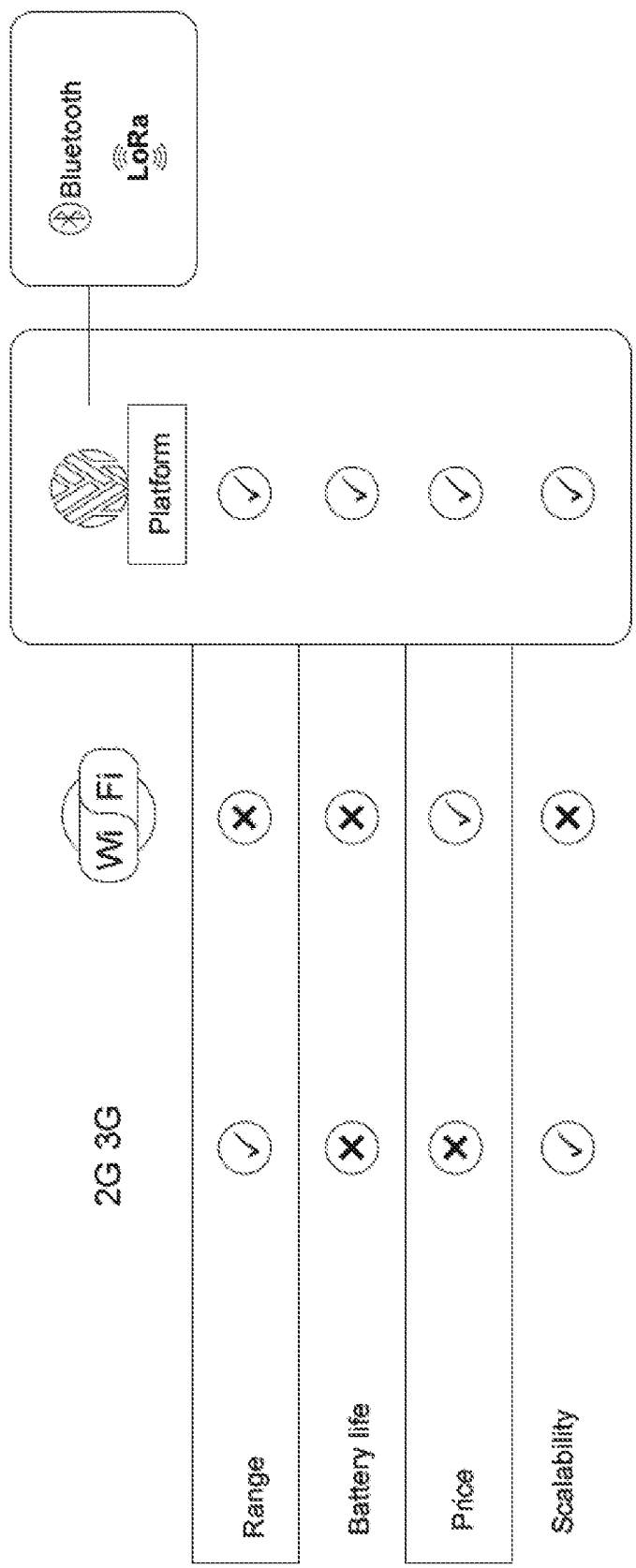
FIG. 6 provides a solutions comparison, for an example of the platform.

FIG. 6 provides a solutions comparison, for example of the platform. 2G and 3G have good range and good scalability. But 2G and 3G both have poor battery life and price. WiFi has good price, but poor range, battery life and scalability. In contrast, the platform described here has good range, good battery life, good price and good scalability.

A Blockchain-Powered (e.g. Global) IoT Connectivity Platform

Unlocking the Potential of IoT

Billions of devices are already connected to the network and are transmitting data. However, approximately 99% of possible data collection points are still unconnected due to limitations of current IoT solutions. The platform is designed to make many more things connected by making connectivity accessible and empowering a development of relatively cheap sensors with a long battery life.

A Crowdsourced DNS of Things

In an example, the platform is built to become a default IoT solution for connecting billions of devices. With the platform, sensors can be integrated everywhere to gather valuable data from every corner, or from steps of a supply chain. The platform allows the possibility to integrate sensors anywhere to gather valuable data by making connectivity accessible & empowering a development of relatively cheap sensors with a long battery life. The platform is designed to make many things connected by making connectivity accessible and empowering a development of relatively cheap sensors with a long battery life.

Figure 7:
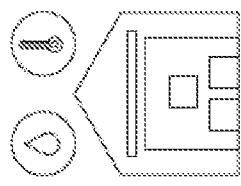
FIG. 7 shows examples of supply chain applications.
Figure 7:
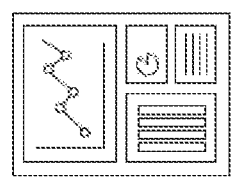
Figure 7:
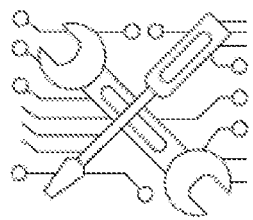
Figure 7:
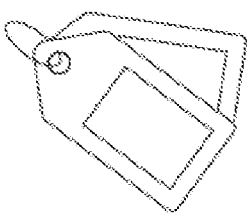
Figure 7:
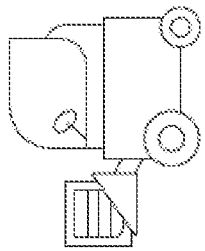
Figure 7:
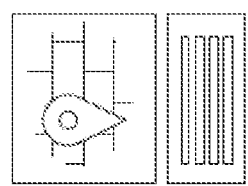
Figure 7:
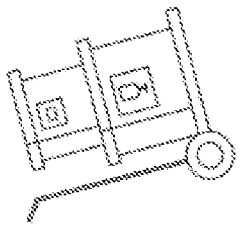

Examples of supply chain applications include applications in: Real-time fleet management; Cargo integrity monitoring; Optimized warehouse workloads; Inventory tracking & analytics; End-to-end visibility into delivery process; Smart labels; Predictive maintenance; Storage conditions control. Examples of supply chain applications are shown in FIG. 7.

Use Case Example: Optimized Warehouse Workloads

The platform helps improve workload of warehousing equipment and assets by creating a connected warehouse system. Warehousing operations can be easily observed and coordinated, down to the level of individual physical assets and stored items.

Use Case Example: Single Product Ecosystem

Figure 8:
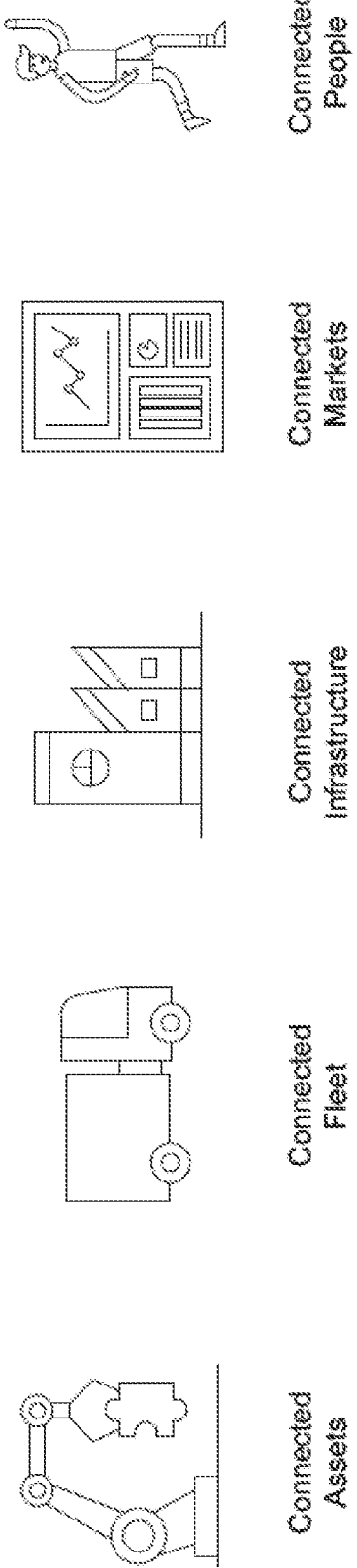
FIG. 8 shows an example of a single product ecosystem.

Inexpensive sensors coupled with multiple connectivity solutions allow for a single product ecosystem: unlocking the potential to analyze the supply chain at every step. The platform allows the possibility to integrate suppliers, deliveries, and end clients in a single ecosystem. Example aspects are: Connected Assets; Connected Fleet; Connected Infrastructure; Connected Markets; Connected People. An example single product ecosystem is shown in FIG. 8.

Supply Chain Case Example

The platform may be used in a pharmacy supply chain solution. A lot of the pharmaceutical compounds are extremely temperature-sensitive. Delivering them to various climate areas presents a unique opportunity for using ultra-portable sensors and BLE to control the transportation conditions, environment and vaccine safety. The platform makes it possible to track every separate box. Data may be collected along the whole delivery route.

Crowdsourcing Infrastructure

The platform crowdsources its infrastructure: data from sensors is transferred using smartphones of regular citizens or any compatible gateway. Citizens themselves become the infrastructure by installing any app with the platform's SDK, or installing a Gateway at home. The platform crowdsources its infrastructure making Bluetooth Low Energy and LoRaWAN accessible by expanding the networks and leveling access conditions.

Very Low Connectivity Cost

Infrastructure (e.g. crowdsourced) & the blockchain nature of the platform allows the possibility to lower the connection cost to almost zero. Low connectivity cost alongside flexible tarification per connection allows for collection of previously unavailable data types. The permissionless nature of the platform creates nearly perfect competition which means the lowest possible price for end users.

Ultra-Efficient Sensors

The platform utilizes LPWAN and BLE standards which are energy efficient protocols. With the platform, cities can use cheap, small (tiny as a sticker) and energy efficient (up to 5 years without charging) sensors which can be placed anywhere. With the platform, cities can use cheap (5-10 times cheaper compared to GSM), small (tiny as a sticker) and energy efficient (up to 5 years without charging) sensors which can be placed anywhere.

Permissionless

In an example, the platform makes it easy to launch new IoT products through its permissionless nature. In an example, all devices will automatically be connected if they are added to the ledger via the website. In an example, all devices will automatically be connected if they are added to the ledger via the website, and are prepaid.

Examples of the Platform's Impact on a City

Innovation: The environment to develop innovative IoT businesses in the city.

Happiness: Creating tailored experiences by sharing data with citizens and businesses.

Efficiency: Decreasing energy & resource consumption by automatically managing them.

Safety: Improving monitoring and decreasing response time.

Innovation

In an example, the platform's permissionless nature along with low per-transaction fees creates a perfect environment for deploying new products. Adding the platform to a robust city ecosystem makes it an ultimate playground for new smart city projects.

Examples of Happiness Cases

Having the platform as a connectivity standard, a city could collect more valuable data. This data can be used for big data analysis or can be shared with citizens or businesses.

Seat Occupation

Sensors can be installed in seats of metro cars & public transport. This information could enable a more even distribution of passengers within the metro car.

Passengers at a station can select the car considering the load;

Passengers at the train will be able to find a seat.

Parking

A city could improve happiness by providing citizens with information about the availability of parking places. Drivers would be able to make informed choices about how it is better to park at their destination, reducing commute time and traffic clutter.

Examples of Safety Cases

Illegal Actions Detection

The platform is secure enough to be included into the emergency services daily work:

Managing break-ins and container openings using breakable or multiple use sensors Placing thin sticker beacons on alcohol bottles to register trespassing into hotel/bar grounds.

People Counters

Collecting data on the amount of people currently occupying public spaces. Useful for emergencies.

Efficiency Cases Examples

Smart Irrigation

Cities can reduce water loss by managing outdoor usage. This is done through installing sensors tracking rainfall, humidity, soil composition, topography, temperature, and sunlight. Coupling this data with information about the landscape and weather prediction enables smarter decisions about irrigation.

Connected Lighting

Connected street lamps enabling cities to enhance the control and performance of every street lamp. With this data a city could eliminate visual inspection and react to issues faster.

Examples of application areas are shown in FIG. 1.

The platform's network can be seamlessly and quickly deployed in a new region.

Smart Car Insurance Example

This provides a way to increase client loyalty and lifetime value (LTV) using the insurance tracker.

Usage-Based Insurance

Insurance tracker provides you with an opportunity to propose pay-as-you-drive price plans to the clients. In short, it means the insurance fee is dynamic according to how the driver acts on the road.

Increase your clientele: minimal starting prices and payments based on actual usage.

Improve loyalty programs: custom tailored price plans based on almost real-time risk assessment.

How does it Work?

An insurance tracker is a small sticker that has a sensor embedded into it. Its size makes it easy use on any kind of car by simply sticking it to the windshield.

Insurance tracker gathers and transfers data on car usage:

Number of days the car was used

Intense speed up and slow down sequences, sharp turns and lane switches performed Insurance tracker collects no personal data.

Tech Specs

The platform provides the technology to gather data by crowdsourcing connectivity. It works using the BLE technology supported by any smartphone that automatically becomes a proximity-activated router once it has a platform SDK app installed.

Protection:

Data encryption

Anti-tamper protection

Anti-removal protection

ACTIVE TIME: 1-3 years

PRODUCTION COSTS: $3-$4.5 (depends on particular implementation)

DATA TRANSFER PROTOCOL: the platform's BLE

Use Case Example: Crowdsourcing Connected Transport in a Country

PROBLEM: Some organizations (eg. United Nations) aim to improve the public transportation systems in the developing countries. Most of the countries in question do not possess full maps of existing routes. Without any actual data on passenger movement there is no way to:

Plan new routes

Set additional buses on existing routes

Solution 1: Connected Transport

Utilizing the platform's BLE package (one of the platform's solutions), organizations (e.g. government bodies or United Nations) will be able to install sensors on any transport. The platform will provide internet connectivity to all sensors in any particular transport. The platform's BLE provides crowdsourced connectivity. Any smartphone positioned close enough to a transport or traveling inside could transfer data from onboard sensors. Data will be transferred without requiring any additional actions from the smartphone's owner.

The platform's BLE uses the Bluetooth Low Energy technology supported by any smartphone. Using any smartphone's Bluetooth module as a proximity activated router, the platform can cover sprawling areas with internet access for the sensors. All that we require is to add the platform's SDK to any popular application in the region. The platform's SDK can be integrated in any app of your choice, be it a utility one or a game.

There are 2 basic options when it comes to sensors for these specific conditions:

BLE Tracking and Counting Sensor

Examples of data types collected:

1. Number of passengers entering and leaving
2. Overall passenger numbers per route
3. Route and travel parameters.

Figure 9B:
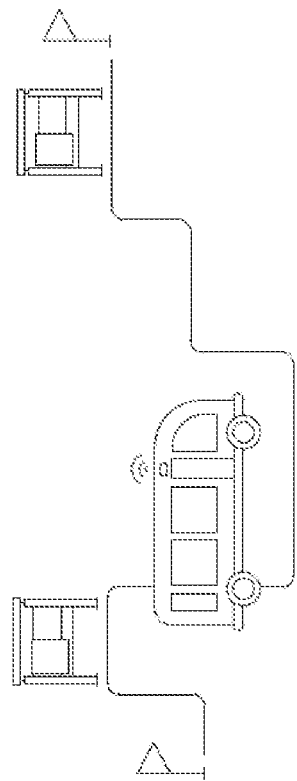
FIG. 9B shows an example of a BLE route tracking sensor.
Figure 9A:
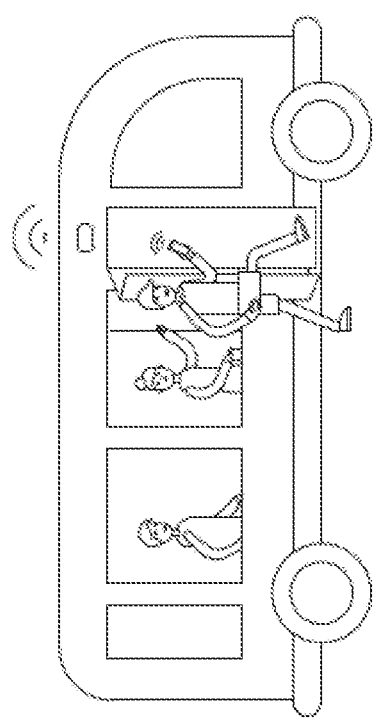
FIG. 9A shows an example of a BLE tracking and counting sensor.

An example is shown in FIG. 9A.

BLE Route Tracking Sensor

Example data types collected:

Route and travel parameters.

An example is shown in FIG. 9B.

These sensors can be placed on government-issued buses or be presented to a private company, in exchange for benefits. Benefits can include, but are not limited to, monetary rewards, along with discounts for fuel, etc.

Solution 2: Traffic Data Collection System

Alternatively, you could use the platform's LR instead of the platform's BLE solution. The platform's LR kit works on top of the LoRaWAN. The platform's LR can connect devices across a large area with up to 10-15 km radius with a single gateway. Having transport equipped with the platform's LR gateways will enable coverage over large territories.

Figure 9C:
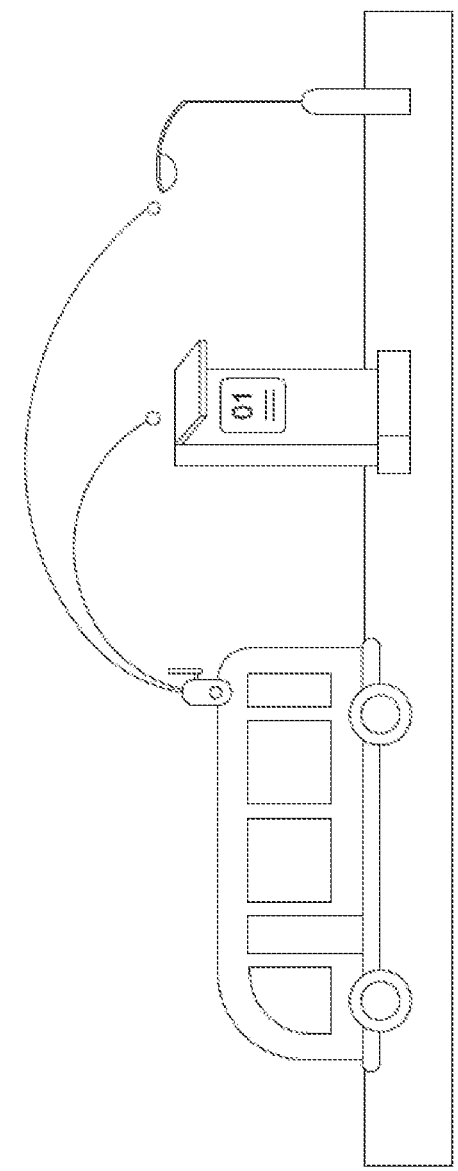
FIG. 9C shows an example in which sensors are placed in villages/cities and on roads along the bus route.

The platform's LR gateway with 3G module could be installed on a transport vehicle. A Gateway will continuously transfer data from the sensors inside the vehicle (eg. bus) (it could be sensors like in SOLUTION 1). More sensors can be placed in villages/cities and on roads along the bus route. An example is shown in FIG. 9C.

Some Examples Are:

1. Traffic counters
2. Pedestrian counters
3. Water usage counters or solar battery power fuel gauges, etc LR solution will require some installation expenses but might be overall more valuable to the region.

Bluetooth

In Bluetooth Class 1, the maximum permitted power is 100 mW, and the typical range is 100 m. In Bluetooth Class 2, the maximum permitted power is 2.5 mW, and the typical range is 10 m. In Bluetooth Class 3, the maximum permitted power is 1 mW, and the typical range is 1 m. In Bluetooth Class 4, the maximum permitted power is 0.5 mW, and the typical range is 0.5 m.

Distributed Sensor Network Using Bluetooth (e.g. BLE)

Sensor Network Limitations and Opportunities

The Internet of Things (IoT) is a network of e.g. devices, vehicles, buildings, and other items containing electronics, software, sensors, and network connectivity which enable those objects to collect and exchange data. The IoT market is set for rapid growth. Cisco's Visual Networking Index predicts 933 million M2M connections worldwide by 2019, while Analysis Mason expects up to 3 billion by 2023.

Internet of Things

In the future, it is predicted there will be more than 24 billion IoT devices on Earth. That's approximately four devices for every human being on the planet. $267 billion will be spent on IoT technologies, products, and services, it is predicted.

Technology

Bluetooth

Bluetooth has always been the most widespread access technology suitable for IoT. Low cost of user equipment, and swift evolution advanced by a well-organized user community allow the standards to remain an integral element of the market landscape. Battery-efficient radio technology, combined with small die sizes make BLE an excellent choice for a wide variety of devices.

LPWAN

The IoT market is overcoming its current limitations with a Low Power Wide Area Network (LPWAN) protocol. LPWAN is a prime IoT solution that offers extended battery life (3-50 times lifetime advantage over a GSM/3G/4G network), improved efficiency, and wider cell radius (e.g. up to 15 km). LPWAN may encompass LoRaWAN, Sigfox, and IoT Narrow Band.

Listing of Aspects or Limitations

LoRa WAN

Large number of separate networks

Lacks interoperability and consensus

IoT Narrow Band

Not currently available

Developed as a traditional telco solution

Sigfox

Proprietary technology

One owner, no direct market access

Bluetooth

Very small footprint (~10 m)

Peer-to-peer (P2P) topology—there is no way to create a local network of devices Mesh functionality Bluetooth Mesh Networking Bluetooth mesh networking is a protocol based upon Bluetooth Low Energy that allows for many-to-many communication over Bluetooth radio. Communication is carried in the messages that may be up to 384 bytes long, when using Segmentation and Reassembly (SAR) mechanism, but most of the messages fit in one segment, that is 11 bytes. Each message starts with an opcode, which may be a single byte (for special messages), 2 bytes (for standard messages), or 3 bytes (for vendor-specific messages).

Every message has a source and a destination address, determining which devices process messages. Devices publish messages to destinations which can be single things/groups of things/everything.

Each message has a sequence number that protects the network against replay attacks.

Each message is encrypted and authenticated. Two keys are used to secure messages: (1) network keys—allocated to a single mesh network, (2) application keys—specific for a given application functionality, e.g. turning the light on vs reconfiguring the light.

Messages have a time to live (TTL). Each time a message is received and retransmitted, TTL is decremented which limits the number of "hops", eliminating endless loops.

Bluetooth Mesh is a flood network. It is based on the nodes relaying the messages: every relay node that receives a network packet that authenticates against a known network key that is not in message cache, that has a TTL≥2 can be retransmitted with TTL=TTL−1. A message cache is used to prevent relaying messages recently seen.

Bluetooth Mesh has a layered architecture, with multiple layers.

Example Platform as a Solution

An example platform allows you to integrate existing IoT networks or deploy new ones, becoming your own in-house service provider.

An example platform works on top of two "last-mile" technologies.

1) LoRaWAN—most suitable for industrial and business applications where speed and reliability are critical.
2) Bluetooth Low Energy—with customer smartphones acting as mobile gateways. It is most suitable for non-critical consumer and big data applications, such as collecting data for later analysis.

Device Manufacturer

With an example platform, device manufacturers could easily become global service providers. Your IoT devices will work anywhere, without limitations and the need to forge a patchwork of complicated contracts with carriers.

Gateway Owner

Anyone could provide IoT connectivity and earn revenue with a gateway of an example platform. You'll get a share of transaction revenue for each connection made through your gateway.

In an example platform, there are two types of gateways:

Dedicated LoRaWAN gateways of the platform for LoRa-compatible devices.

Smartphone gateway application of the platform for platform-enabled Bluetooth LE sensors.

User

Global coverage for your IoT devices at cut-throat rates? No problem!

The platform's systems are ready to handle both private and business applications, anywhere from smart homes, to smart production lines, to smart cities.

All data may be end-to-end encrypted, in compliance with industrial standards.

Example Workflow

Manufacturers release devices and add their IDs to the platform's ledger

Customers buy those devices and begin using them

Gateway owners provide network access for those devices and check their IDs against the platform's ledger Manufacturers cover platform's bills issued by participating gateways The platform pays the gateway owners for their services Example of how does it Work?

An example platform system includes the following core elements:

IOT DEVICES—Radio Frequency (RF)-enabled IoT devices connect to the platfom's gateways from as far as 15 km.

GATEWAYS—LPWAN gateways and Bluetooth LE-enabled phones are used to mine coins or tokens during connections and expand the network.

BLOCKCHAIN—Core (Platform as a Service: PaaS) billing and application browser that executes the platform's protocol.

EXAMPLE PLATFORM—Blockchain environment used to create a Decentralized Autonomous Organization (DAO) along with secure data storage.

IoT Devices

Device market is filled with IoT devices enabled with various radio access technologies. They all need to be networked! Example IoT applications include:

Utility meters
Parking sensors
Water/gas leak detectors
Gunshot detectors
Air quality and weather sensors
Attendance counters (big data!)
Panic buttons
Public transportation trackers
Street and traffic lights
Home & office security
Gateways An example platform employs specially designed gateways to offer IoT connectivity. An example platform offers two types of gateways: a LPWAN base station design with ~15 km cell radius, and a smartphone app that provides access over Bluetooth LE, collecting data from surrounding IoT devices. In an example, all client devices that connect to a user-deployed gateway will earn the gateway owner additional tokens.

Example Platform

An example platform is designed with ease-of-use in mind, and includes one, or more, or all of the following:

Access for multiple client devices can be paid for from a single account
Built-in wallet
Devices and connections can be controlled by a single click
Coverage area mapping and deployment planning out of the box
Vote to add support for new radio access standards and more Example Including Blockchain A decentralized system gives everyone an opportunity to get involved. Device manufacturers can become internet providers, users can become device manufacturers, and everyone can become a small-scale cell operator. A token economy returns all equipment & service expenditure straight to users that expand our network by installing gateways.

Use Cases Examples

Affordable security—Faster emergency response, improved traffic control and response routines.

Smart buildings—A smart home for everyone, transparent management for municipalities. Lights are always on, and the utility services are better than ever.

Supermarkets—Improve loyalty, keep track of inventory, and offer more choice. Learn what's in demand, keep things in stock, and keep customers happy.

On the production line—Monitor your equipment to create optimal workflows and maintenance schedule.

Outside the factory—Use additional sensors to know exactly when repairs are needed and who to dispatch.

Inside business processes—Deliver a better experience by designing data-driven solutions and viable sales plans.

Stadiums—Manage seating arrangements, maintenance schedules and even snack vending points to improve the overall customer experience.

Example IoT Toolkit

An example platform BLE toolkit is a solution for big data applications. Typical application: collecting information for later analysis. An example platform BLE toolkit includes open source beacon base station with smartphones acting as mobile gateways. An example platform LR toolkit is well-suited for industrial and business applications where speed and reliability are the prime concerns. Typical application: transportation in a smart city. An example platform LR toolkit includes an open source gateway to provide LPWAN connections.

Figure 10:
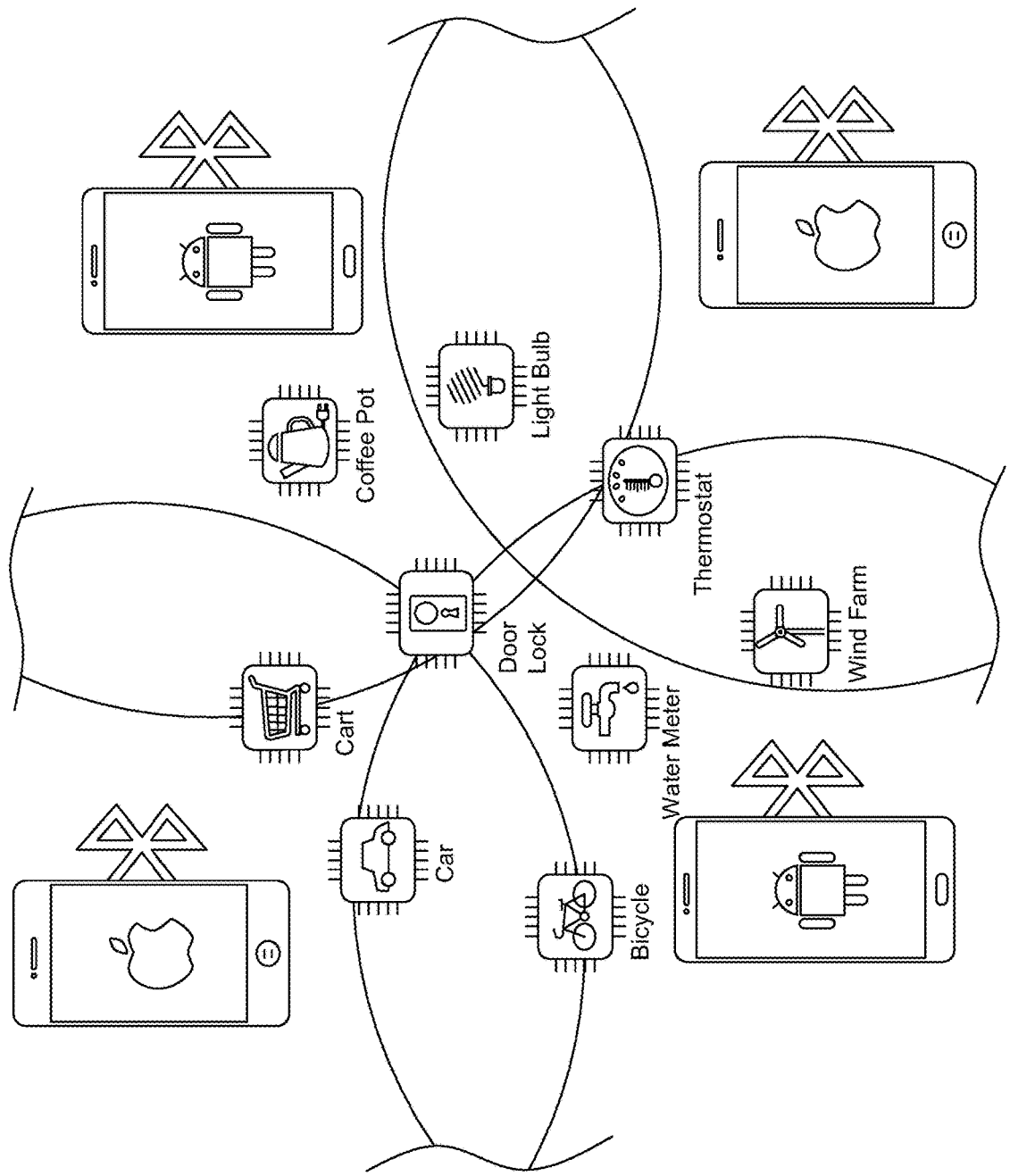
FIG. 10 shows an example in which smartphones collect data via BLE from distributed sensors, in which the smartphones are used as gateways; data may be collected when a smartphone is within a BLE range of a sensor.

Problem: collect data from distributed Bluetooth sensors using multiple mobile phones as gateways. A schematic example solution is provided in FIG. 10. In FIG. 10, smartphones are collecting data via BLE from distributed sensors, in which the smartphones are used as gateways; data may be collected when a smartphone is within a BLE range of a sensor. In an example solution, smartphones collect data via BLE from distributed sensors, in which the smartphones are used as gateways; data may be collected when a smartphone is within a BLE range of a sensor.

There are three example types of connection in a Bluetooth protocol:

Advertising (beacon)—one way communication from "sensor" to "user device"
Two-way communication between trusted devices
Mesh (Bluetooth 5)

Traditionally to connect to a sensor from a user device you need to authorize the sensor. Another issue is there is no guarantee that data routing application is running in the background on iOS or Android smartphone. In an example, the platform's BLE solves this by using hybrid beacon mode. In this mode a "sensor" sends beacon advertising signal when it's not connected to the smartphone. The platform's smartphone application sets up a geofence zone to all platform BLE sensors, so it runs a small part of code each time when a smartphone enters sensor advertising zone. (A geofence is a virtual perimeter corresponding to a real-world geographic area.) This part of the code is responsible for data routing—so it connects to the sensor, downloads the sensor data and sends it to the destination (eg. in the cloud).

Each sensor could have an ID relating to the platform and a secure key in internal memory, and all data sent through the user smartphone may be end-to-end (sensor to the cloud) encrypted implying the user can't read it until he has necessary key for the sensor. A sensor key may also be used for correct accounting of the routed data—so user might be rewarded for the routed data amount.

By implementing this scheme, we could deploy multiple Bluetooth sensors which could be connected to multiple smartphones acting as gateways to the sensor data destination. And there is no need to pair a specific sensor with a specific smartphone.

Example System Description and Structure

The platform is a service platform that allows you e.g. to deploy city-wide IoT networks in a decentralized manner. In comparison to a traditional telecom approach, the platform provides you cost-effective and rapid deployment.

Our vision is: interoperable and transparent connectivity for cities, individual households and major enterprises alike.

Today, providing connection services in any capacity requires a large investment to establish initial low-range base station and receiver infrastructure along with maintenance, electricity costs and challenging software. It is predicted that the City-scale IoT market will grow to 25 billion USD by 2021.

The platform deals with every market participant—as in the case of usual connectivity infrastructure we deal with gateway owners, service providers, and hardware manufacturers. Within the platform anyone can become a service provider and get revenue through every connection, billing other users within the active range of your connectivity node. All connections are recorded within the common ledger creating a transparent billing.

Hardware manufacturers—an opportunity to sell devices worldwide with no need to talk to LPWAN providers. With the help of the platform, hardware manufacturers could easily become service providers as soon they are able to offer a world-wide connectivity package together with their devices.

Current LPWAN providers—will benefit from seamless worldwide roaming and easier end-customer devices sign-up procedure.

Private gateway owners—gain profits from anyone who uses the gateway within active range.

Infrastructure owners/Smart cities—select most affordable IoT solution and deploy it within weeks.

The platform provides a most transparent and secure way to build IoT infrastructure. This solves two major tasks for somebody to become a provider—billing and security, while preserving market transparency. Our vision is interoperable and transparent connectivity for cities, households, individual devices, and major enterprises alike.

Example of how it Works

The platform works with every market player, including gateway owners, service providers, and hardware manufacturers. Within our solution, anyone can become a service provider and receive revenue with every connection, billing other users within the active range of their gateway or Bluetooth LE smartphone. All sessions are recorded and stored within the common ledger, enabling fully transparent billing.

Today, providing IoT connectivity requires not only substantial initial investment to deploy low-range base stations and receiver infrastructure, but also extra operational expenses: maintenance, electricity, and software support. By 2021, the market of city-scale IoT is predicted to reach to US $25 billion.

With the help of the platform, hardware manufacturers could easily become service providers as soon as they offer a global connectivity package with their devices.

Current LPWAN providers: Benefit from seamless worldwide roaming and easier onboarding procedures for end customers.

Private gateway and BLE smartphone owners: Earn revenue from anyone who relies on your gateway within its active range.

Infrastructure owners/Smart cities: Choose the most affordable IoT solution and deploy it in mere weeks.

The platform offers a global platform, a reference design, and open-source software for coverage mapping and planning, access control, logging, billing, and handling of smart contracts. Example business sectors using IoT devices are enterprise, government/infrastructure and home.

Example User Roles

Device User

Last level of user is the end user. An end user acquires devices and uses them in accordance to manufacturers policies with any node around the world. The end traffic costs are extremely low, there are no roaming charges and there is the same format and high battery efficiency anywhere.

Users can tackle any concern using the voting mechanics and the committee of the platform at their disposal. That creates a true user-owned, decentralized network run by its own customers.

End user to device producer relationship is not included into the constraints of the network of the platform. It can be a separate service or a free-to-use arrangement. Our network creates the opportunity to create cheaper devices and provide active usage within the infrastructure of multiple nodes. Device producers and node owners may operate within the boundaries of cryptocurrency transactions while the end user does not, for example.

A typical user can use any node within range, all of which may be owned by individual users. As a node owner, a user may be free to set his tariff on services and internet access for anybody using his node. All of the in-system transactions use crypto-tokens and generally work in two ways:

Users with an access point purchase traffic quotas from the major token stakeholders Users, taking advantage of connection points pay to the providing users for the amount of traffic used.

All of this may be controlled by blockchain—the most secure way of tracking contractual obligations online.

Example Device Manufacturer

In an example, the platform is a new generation physical layer for mesh-networks with an internet connection with M2M capabilities made to update the internet access worldwide. It utilizes base stations with low cost and high effectiveness to create long-range communication chirp spread spectrum modulation. This provides for unprecedented ranges of up to 15 km range, while maintaining a possibility of working for decades from a small power source.

While it's not the only network system to utilize this protocol to date, the platform is based around a 3-layer (long-range star) server architecture, providing an ability to unify any kind of different networks and connection standards using base stations. This provides for extremely high integration possibilities with low end-user costs, high scalability, great connection speed and quality.

Example Node Owner

A hardware infrastructural level are the node owners. Node owners are also miners in the network of the platform. They use cheap network stations to enlarge the network coverage while simultaneously receiving a percentage of every connections worth. This is a major part of community—a smart household would benefit greatly from owning a private node and all the while acquiring extra income. A large-scale user (like a skiing resort, city or a factory) would create a network that can serve the whole area around them.

Node Owner is a "Miner"

As the device producers get the opportunity to create cheap devices, service providers get to create access points using cheap and effective network nodes. Any individual person is able to purchase and install the node in an apartment or even outside. This kind of user is a node owner. If the node is active and exchanges data with the devices inside the network, a node owner acquires coins or tokens. The more nodes owned and traffic provided—the more coins or tokens are received.

A node can be purchased as a boxed and assembled product, but can be easily obtained and assembled by a person with no special knowledge. A complete document will hold a diagram for assembling a compliant node unit.

Committee

In an example, the platform has a foundation committee which regulates acceptance of the protocols and hardware for nodes in a such way that only accepted nodes receive an additional bounty for being the part of the network. This is done for the purpose of scam protection (e.g. when a user sets up a very cheap useless node to get bounty) and adoption of new technologies and protocols.

Voting may be available for anyone with a token share of e.g. more than 10 000 MOE. (1 MOE is one token unit).

Votes may be for:

Approving budgets for software (SW) development

Approving budget for the platform's Foundation team

Approving new protocol adoptions for different locations (bonus MOE)

Approving hardware adoptions for new locations (bonus MOE)

Approving protocol and hardware retention for certain locations (thus no more bonus MOE)

Setting up a minimal location-based access price.

Setting up a hard minimal price for any location.

Voting may be done via blockchain by sending a small amount of MOE to a certain address. 10 000 MOE may be counted as 1 vote. A share of 10 000 000 MOE may be counted as 100 votes. Pooling may be acceptable. The platform's foundation itself may use up to 100 votes.

Example Data flow

Main actors, in an example:

IoT device, produced by specific Vendor with the identification in the blockchain and encrypted MineId Gateway could be manufactured, or assembled by anyone who can add a Gateway SDK of the platform to the Gateway Firmware to be able to communicate with blockchain.

Blockchain trustless distributed database with the transactions from all the devices.

Masternode is a blockchain application server that processes transactions

Server managed by a particular vendor that receives encrypted data from the Gateway or from the Blockchain Example Uplink Flow:

1. Vendor server creates an uplink message for the particular DeviceId at the Vendor's masternode.
2. Masternode creates uplink transaction request in the Blockchain, each uplink request shall be marked with the Gateways which already processed this specific DeviceId before.
3. Gateways are checking blockchain for an uplink requests with the specific GatewayId.
4. In case if uplink request for the specific Gateway is found, Gateway stores the uplink message locally.
5. Gateway is waiting for the specific device with the specific DeviceId to send the data.
6. When Device is sending the data, Gateway responds with the uplink message and confirms the uplink transaction request.

Example Downlink Flow

Figure 11:
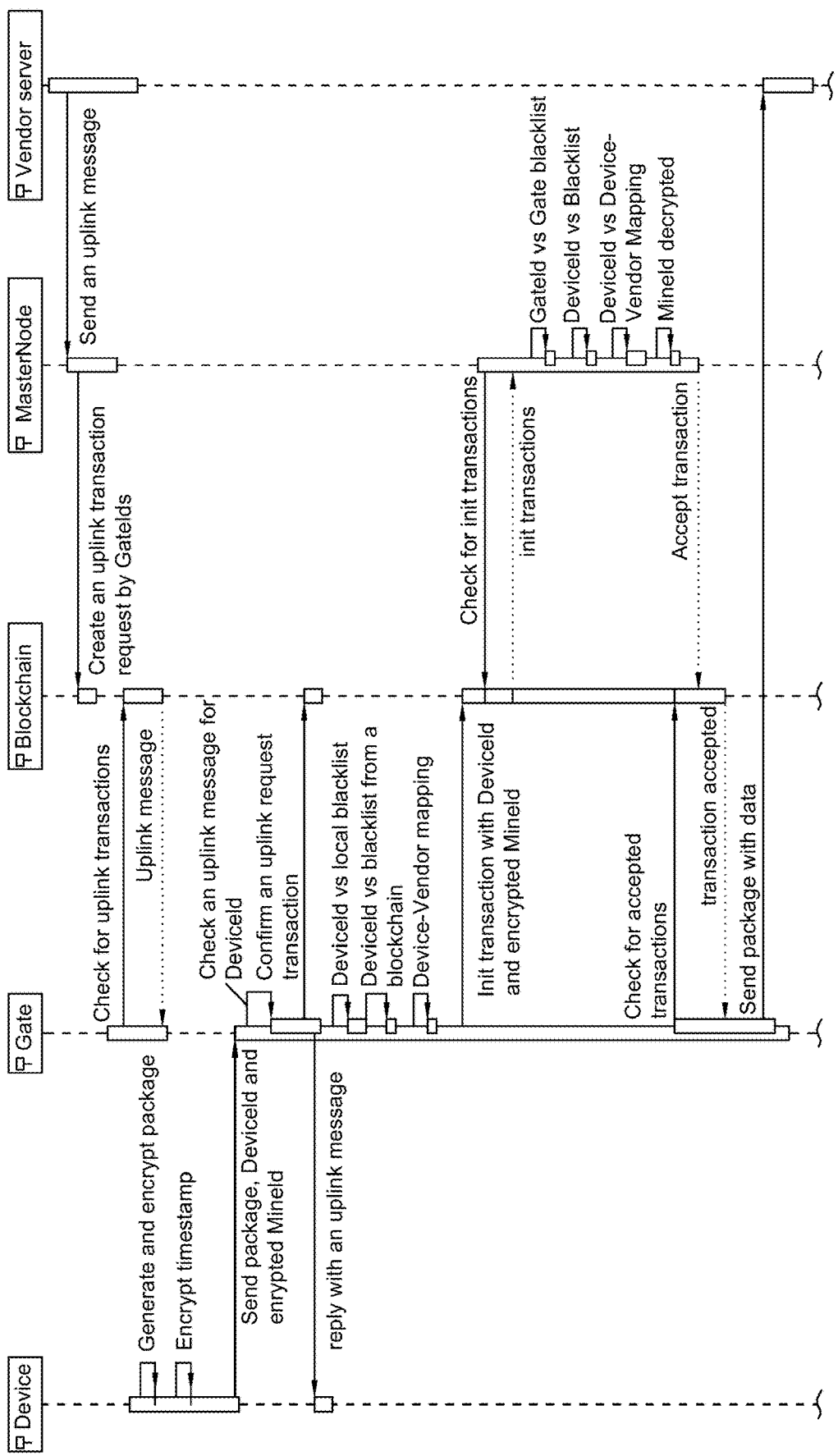
FIG. 11 shows an example downlink flow.

1. Device encrypts the Data
2. Device encrypts MineId
3. Device makes the package with DeviceId, encrypted MineId, and encrypted Data
4. Device broadcasts the package
5. One or many Gateways are receiving the package
6. Gateway checks DeviceId against local device blacklist
7. Gateway checks DeviceId against device blacklist pulled from the blockchain
8. Gateway checks DeviceId against device-vendor mapping from the blockchain
9. Gateway initializes new transaction in the blockchain with DeviceId and encrypted MineId
10. Masternode checks for initialized transactions
11. Masternode checks GatewayId against Gateway blacklist from the blockchain
12. Masternode checks DeviceId against DeviceId blacklist from the blockchain to prevent fraud
13. Masternode checks DeviceId against Device-Vendor mapping
14. Masternode makes an attempt to decrypt MineId
15. Masternode validates decrypted MineId
16. Masternode accepts transaction
17. Gateway checks the blockchain for accepted transactions with specific GatewayId
18. Gateway sends encrypted data to the specific Vendor's server An example is shown in FIG. 11.

Another case is possible for vendors, who might prefer to store the downlink data in the blockchain; in that case Gateway will store the data in the blockchain right after transaction is accepted.

Example Token Flow

Main Actors:

There is a Vendor representative, who is responsible for managing billing and data transport for specific Vendor's device. Vendor representative flow, in an example, is as follows:

1. Create a wallet in the blockchain.
2. Top up the wallet with coins or tokens of the platform.
3. Register devices produced by a specific vendor in the blockchain, add each device to a Device-Vendor mapping.
4. In case if specific Gateway is making invalid transactions—ban the gate.
5. Manage cryptographic keys to decrypt messages from devices.

There is a Gate owner, who might have one or many gateways and is responsible for gate maintenance. Gate representative flow, in an example, is as follows:

1. Create a wallet in the blockchain.
2. Register each gate in the blockchain with the Gateway Owner's wallet.
3. Get GateIds from the blockchain.
4. Set Gate Id for each Gateway.
5. Monitor transactions made by Gateways.
6. Get reward for transactions processed.

Figure 12:
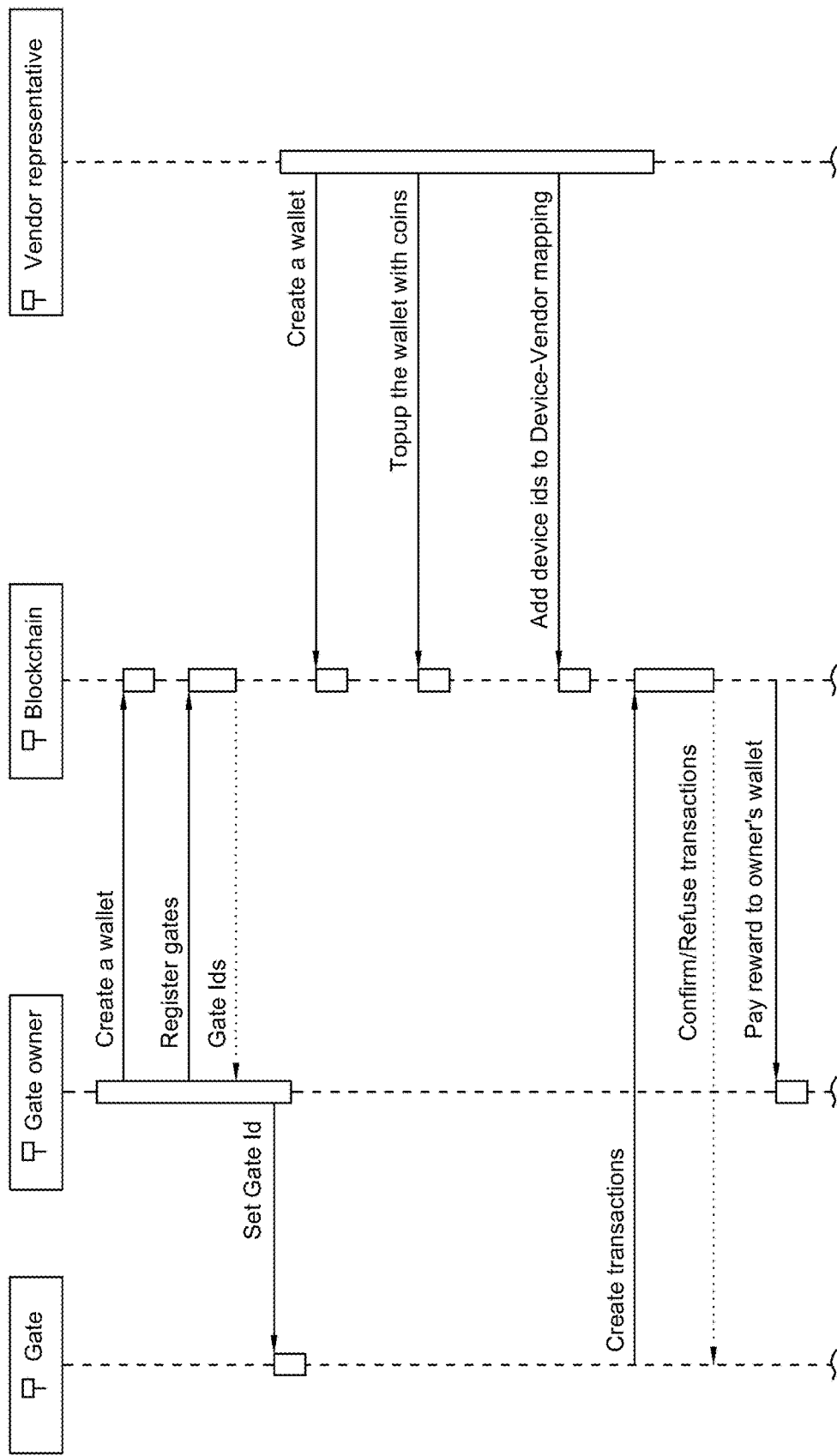
FIG. 12 shows an example token flow.

An example is shown in FIG. 12.

Example Billing System

Figure 13:
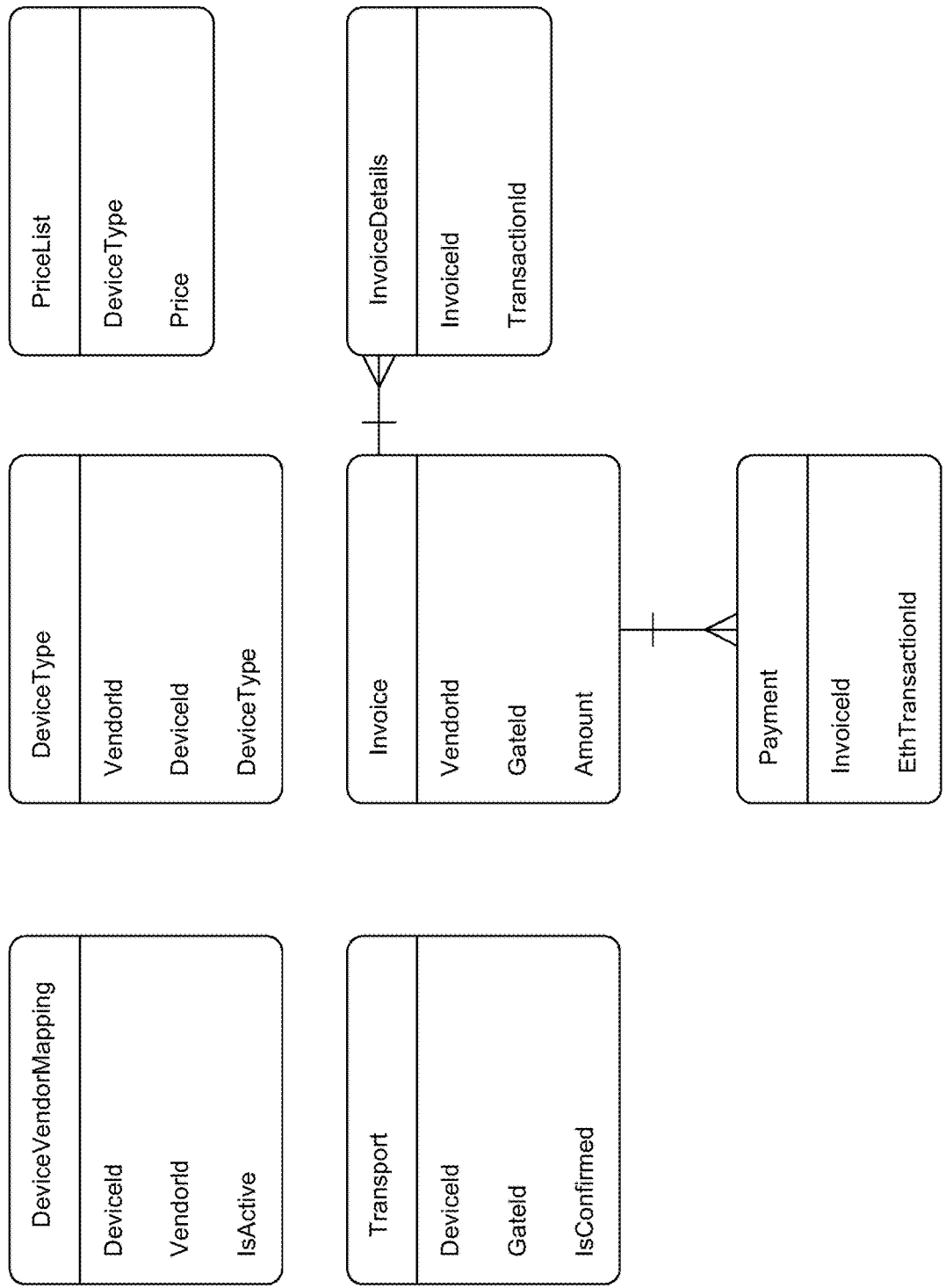
FIG. 13 shows an example billing system which may include up to 6 separate blockchains, if necessary: DeviceVendorMapping, DeviceType, PriceList, Transport, Invoice (including InvoiceDetails) and Payment.

An example is shown in FIG. 13.

An example billing system may include up to 6 separate blockchains:

DeviceVendorMapping—A storage of all device IDs that are a part of the platform. IsActive flag is used for accepting device transactions when vendor managed to pay for all the previous transactions.

DeviceType—Each vendor device type.

PriceList—Service price for each type of device.

Transport—Blockchain that holds information on completed transport transactions holding a lot of data including an IsConfirmed flag that means that a package was successfully delivered from the device to a vendor.

Invoice—Blockchain that holds information on vendor and gate account transactions including InvoiceDetails for further check-up.

Payment—Blockchain to collect payment status info.

Billing system process and rules are the following, in an example:
1. the Vendor includes all of the Device ID's into the Device Vendor Mapping blockchain.
2. Vendor divides devices into types, creating separate connection prices with the price list stored within the blockchain. The platform's Foundation defines the minimum price that is stored within the blockchain.
3. Master Nodes approve the valid transactions, writes them into the Transport blockchain and signs the block.
4. Based on the signed transport block, Master Nodes create transactions in the Invoice blockchain. Every input is a transaction invoice from every Gateway to every Vendor according to the price list.
5. If the last signed transport block has no transactions that are not linked to the particular invoice, Master Nodes signs the block in the Invoice blockchain.
6. Based on the last block in the Invoice blockchain a new block in the Payment blockchain is created.
7. Vendor Master Nodes pay the invoices through the Ethereum wallets of their gates and write the Ethereum transaction ID's into the Payment blockchain. Other Master Nodes confirm the payment amounts—if the payment sum is equal or larger of that in the invoice—payment transaction is approved. A single invoice might be paid with the multiple Ethereum transactions.
8. As soon as every Invoice transaction has a confirmed Payment blockchain transaction, Master Nodes can sign the block in Payment blockchain.
9. If more than one block is in the payment queue and the Payments block is not signed because of payment delays or invalidity, such invoices are transferred to the next block with a "delayed payment" attribute.
10. If the payment with a "delayed payment" attribute is not signed during X amount of time all of the vendor's devices in DeviceVendorMapping are marked as IsActive=False and the Gateways will not process the transactions from that vendor until the debt is paid.
11. Rewards Pool has a Gate and a Vendor account at the same time. Rewards Pool issues invoices to all the vendors and all the Gateways issue invoices to the Rewards Pool to gain Rewards.
12. The platform's Foundation has a separate blockchain that holds information on Rewards. The platform's Foundation issues invoice to all the Vendors.

Example of a Token Economy
1. Tokens are used in the transactions within the platform.
2. Connection prices are pre-fixed by the vendor so that all the costs can be calculated in advance.
3. Reward Pool allocates resources for the optimal functionality of the network. Reward pool uses a percentage of transaction sum total.
4. Rules for the reward pool are defined by the committee.
5. Connection price depends on the device type, connection mode and is defined by the vendor through adding a list of device types and prices to the blockchain by the Vendor.
6. Gates might not approve connections that are too cheap.
7. In this model the Vendor is interested in active connections and data processing.
8. At the same time higher connection price not only gives a priority in connection but adds more value to the network through a 10% protocol fee.
9. Minimum connection price is set for example by Foundation to prevent scamming.
10. Gateways compete for connections providing a certain level of quality of service (QoS) and transmitting the blocks first.
11. A single Master Node can't choose a single Gateway to issue payments to.
12. We expect that connection price will drop to the point of minimum economic viability.
13. The platform's committee has the ability to prioritize some gates by adding a certain number of transactions to priority nodes (for example, using a new protocol or located in network development sites). In this case, the resource allocation function of the pool takes into account these transactions in the normalization coefficient.
14. The platform's Committee can vote for certain decision using pre-installed voting mechanics.

Case Studies Examples
1. Wearables—fitness
2. Smart city

The platform may establish a solid infrastructure based on original equipment manufacturer (OEM) platform solutions—LoraWAN gateways, each cover up to 1500 devices simultaneously. We estimate an average city having 40 km in diameter and 1 million of inhabitants will have about 10000 gateways enabling 100× full coverage of any place in the city with 10× node availability. The platform may also include a masternode software that is able to receive and validate messages sent through the platform's protocol. One master node is able to handle up to 2 thousand messages per second, thus handling more than 1 million of smart devices such as lamp posts.

The platform's partners with local city government promote new value for a smart city. The platform may require no setup fee for the infrastructure of the smart city and introduces a very competitive pricing. A Government Authority may impose any regulations for gateways. The platform offers a protocol and software for free, allowing the collaboration with local companies which implement and support smart city solutions. Smart city case enables a lot of devices, empowering the economy.

The gateway coverage and profit is ensured by a special bounty fund made for the platform's pioneers. The main aim of bounty fund is to support early gateway owners before the amount of smart devices will reach a gateway payback point. The platform's framework is capable to support most of the LPWAN standards and chip technologies such as LoRaWAN and Sigfox. Due to trustless distributed blockchain technology, the platform is focused on both: cutting the costs of smart device maintenance, and increasing the coverage compared to private vendor solutions.

Early-bird device manufacturers benefit from gateway owners who are motivated by crypto economy, token growth and pool bounty system—thus ensuring the demand for the devices by gateway owners which might be compared to early bitcoin miners with bitcoin mining rigs. The connection cost is the significant part of the device overall cost/a year and the chip cost increase is small, thus manufacturers earn more and users pay less. A partnership with large cities allows the platform to have an initial public relations (PR) campaign, usage statistics and economy starting point.

Example Case 1

The node owner is a skiing resort. It distributes small connected tag devices from the producer among its clients. Tag devices provide real time location on each user and are extremely effective in locating people in case of emergency and might be even capable to provide a two-way communication channel while functioning on a small power source for a number of days.

The first resort to install the network will have a high chance of covering its own costs by providing the connectivity features to neighboring resorts due to a long communication range.

Example Case 2

A simple feedback device can tell you if your elderly relative is in difficulty or make sure your child is safely home. And you will never have to worry about them if they are late home ever again. A connected device can automatically send a distress signal based on some pre-installed trigger, sending in emergency services or letting you know people close to you need your help.

Market of Communications—Analytics

M2M Market is forecasted to see significant growth; however different technologies are favored by different researchers. An important benchmark for the platform, however, is the number of connections.

Significant variations are predicted for the market size in different technological branches. This is a clear sign of market immaturity (according to "Real Wireless: A comparison of Ultra Narrow Band (UNB) and Spread Spectrum Wireless Technologies as used in LPWA and M2M applications"):

The IoT and supporting M2M markets are completely new and at a formative stage. New technologies, new use cases, new business models, new start-ups, consortia and groupings all emerge regularly.

Applications are being deployed, often as small scale pilots, in new and varied environments to test take up, benefits and return on investment.

There are a number of competing LPWA offerings which, when combined with the current lack of LPWA standards, makes procurement decisions more difficult and extended with purchasers and end users trying to ensure they avoid a stranded investment.

What is clear however is that LPWA technology is now a serious market player in M2M wireless connectivity alongside cellular, Wi-Fi, Zigbee, Bluetooth and other proprietary solutions. Machina Research's 'M2M Global Forecast & Analysis 2014-24' forecasts LPWA to be 14% of the 27 billion total installed base in 2024 whilst cellular is forecast to be 8% by the same date (Machina M2M Global Forecast & Analysis 2014-24). LPWA systems are therefore likely to be deployed widely, with systems operating in close proximity.

Concepts

According to a first aspect of these concepts, there is provided a system including a data storage server, a service provider's server, and a gateway, the service provider's server in communication with the data storage server, and the gateway in communication with the data storage server,
  wherein the data storage server is configured to generate first tokens, to receive a registration from the service provider's server, and to issue first tokens to the service provider's server, and to receive a first token from the service provider's server,
  wherein the data storage server is configured to receive sensor data from the gateway, the gateway arranged to receive the sensor data from a device registered at the service provider's server, the data storage server configured to issue second tokens to the gateway after receiving the sensor data from the gateway,
  the data storage server further configured to store the received sensor data on the data storage server or to store the received sensor data on the service provider's server, wherein the sensor data is stored using a blockchain system, wherein token transactions for the first tokens and for the second tokens are stored using the blockchain system, and wherein the data storage server, the service provider's server, and the gateway are registered nodes in the blockchain system. The data storage server may be configured to not store the received sensor data on the data storage server but instead to store the received sensor data on the service provider's server.

An advantage is that sensor data is stored securely, because it is stored using the blockchain system. An advantage is that token transactions are stored securely, because they are stored using the blockchain system. An advantage is that sensor data and transaction data are securely stored in the same blockchain system, which means that transactions are very reliably associated with respective sensor data storage activities.

The system may be one including a plurality of gateways, the plurality of gateways in communication with the data storage server, wherein the data storage server is configured to receive sensor data from the gateways, the gateways arranged to receive the sensor data from a device registered at the service provider's server, the data storage server configured to issue second tokens to the gateways after receiving the sensor data from the gateways,
  the data storage server further configured to store the received sensor data on the data storage server or to store the received sensor data on the service provider's server, wherein the sensor data is stored using the blockchain system, wherein token transactions for the first tokens and for the second tokens are stored using the blockchain system, and wherein the gateways are registered nodes in the blockchain system. An advantage is that many gateways can be used to gather sensor data. An advantage is that the system provides for many gateways to receive second tokens, in relation to sending sensor data to the data storage server. An advantage is that sensor data gathered by the gateways and transaction data associated with the gateways are securely stored in the same blockchain system, which means that for the gateways, transactions are very reliably associated with respective sensor data storage activities.

The system may be one in which the plurality of gateways include a plurality of LR gateways and a plurality of BLE gateways. An advantage is that sensor data may be received by both short range connection, and by longer range connection, which covers a broad range of connection distances.

The system may be one in which the gateways are arranged to receive the sensor data from a plurality of devices registered at the service provider's server. An advantage is that sensor data may be received from many devices.

The system may be one in which the system includes a plurality of service providers' servers, the service providers' servers in communication with the data storage server, wherein the data storage server is configured to generate first tokens, to receive registrations from the service providers' servers, and to issue first tokens to the service providers' servers, and to receive first tokens from the service providers' servers, wherein token transactions for the first tokens are stored using the blockchain system,
  and wherein the service providers' servers are registered nodes in the blockchain system. An advantage is that sensor data relating to service providers' servers and transaction data associated with the service providers' servers are securely stored in the same blockchain system, which means that for the service providers' servers, transactions are very reliably associated with respective sensor data storage activities.

The system may be one in which the system includes a plurality of gateways, in which the gateways are arranged to receive the sensor data from a plurality of devices registered at the service providers' servers. An advantage is that sensor data may be received from many devices.

The system may be one in which a service provider's server is a security service provider's server.

The system may be one in which the device registered at the service provider's server is a mobile computing device.

The system may be one in which the mobile computing device is a smartphone.

The system may be one in which the device registered at the service provider's server is a desktop computer, or a household appliance.

The system may be one in which the data storage server includes a user account, the account configured to store sensor data associated with the user account.

The system may be one in which the stored data associated with the user account is secure and is accessible only by the account user. An advantage is user control over stored data in a user account. In an example, sensor data is always encrypted by a sensor owner, and may be decrypted only by the sensor owner.

The system may be one in which every decision on using this stored data, by services or sharing it in any way, is made by the user, not any operational service or third-party company. An advantage is user control over stored data in a user account.

The system may be one in which the first tokens and the second tokens are cryptocurrency tokens. An advantage is security of token transactions.

The system may be one in which the first tokens are purchased by companies that operate different applications (e.g. security applications).

The system may be one in which a newly registered node in the blockchain system receives a full copy of the blockchain, which is downloaded automatically to the newly registered node, upon the newly registered node joining the system.

The system may be one in which a newly registered node in the blockchain system receives a copy of the blockchain for only a most recent time period (e.g. the most recent ten weeks), which is downloaded automatically to the newly registered node, upon the newly registered node joining the system.

The system may be one in which the blockchain system has complete information about the registered nodes and their token balances, right from a genesis block to a most recently completed block.

The system may be one in which the system includes a security device which transfers the sensor data to the data storage server via a first layer service.

The system may be one in which the data storage server aggregates the sensor data and transfers the aggregated sensor data to a common environment via a second layer service.

The system may be one in which the aggregated sensor data is stored using the blockchain system.

The system may be one in which a single second token serves as a transaction confirmation and is used to perform one transaction.

The system may be one in which the blockchain system ensures every transaction is unique and secure.

The system may be one in which after the sensor data is stored using the blockchain system, there is no way of falsifying the information.

The system may be one in which the data storage server is configured to provide an ICO (initial coin offering).

The system may be one in which in the ICO, the data storage server provides companies the possibility to purchase the first tokens to participate in the system.

The system may be one in which second tokens are continuously released as needed.

The system may be one in which the second tokens are reusable.

The system may be one in which the second tokens serve as a form of payment to the gateway.

The system may be one in which the second tokens are exchangeable into traditional currencies.

The system may be one in which only the data storage server is configured to issue additional first tokens.

The system may be one in which the blockchain system includes a transaction blockchain system and a billing blockchain system.

The system may be one in which the transaction blockchain system logs all data connections and data transfers.

The system may be one in which the billing blockchain system issues invoices based on information from the transaction blockchain system.

The system may be one in which the billing blockchain system processes and logs all payments, and approves second token payments to gateway owners.

The system may be one in which the system includes a Domain Name System (DNS) of things: a platform integrating various connectivity standards and connecting a plurality of devices.

The system may be one in which the system uses crowdsourcing to gain coverage.

The system may be one including a ledger, wherein a device is automatically connected to a network if it is recorded in the system's ledger.

The system may be one in which the system includes Low-Power Wide-Area Network (LPWAN) and Bluetooth connectivity.

The system may be one including Bluetooth Low Energy (BLE), in which the system Bluetooth Low Energy (BLE) uses customers' smartphones as mobile gateways.

The system may be one in which application areas for the system are one or more of: Smart cities; Agriculture; Usage data collection; Retail; Resource management; Transportation & Logistics; Customer experience analysis, and Humanitarian aid.

The system may be one in which the system is usable by delivery companies, in which tracking sensors are included within packages for delivery, to provide sensor data for gateways.

The system may be one in which the packages for delivery are tracked from supplier to client.

The system may be one in which granular data is collected, including one or more of: Time spent in stock; Time spent in delivery; Time to shelf.

The system may be one in which the system is used by a construction company on a construction site, or by a management company for a constructed building.

The system may be one in which the construction company on the construction site uses the system to control noise level and implement automated closed-circuit television (CCTV) solutions on the buildings under construction.

The system may be one in which the management company for the constructed building uses the system to control the closure/opening of manholes, attics, or stairwell spaces in an apartment in constructed buildings.

The system may be one in which the system is used by a manufacturer of carbonated beverages for sensors in refrigeration monitoring equipment.

The system may be one in which the system provides current infrastructure operators with the opportunity to earn extra revenue from an existing network.

The system may be one in which infrastructure operators can share an existing network with others and get benefits from using other operators' networks.

The system may be one in which the system provides a smart city with one or more of: (i) seamless infrastructure deployment; (ii) cost-effective connectivity solutions, or (iii) easy integration.

The system may be one in which a smart city uses the system for one or more of: Environment monitoring; Security and safety; Parking meters; Street lighting; Retail solutions; Utility services; Transportation; Waste management; Port logistics; Citizen data sharing.

The system may be one wherein sensors are placed to obtain real-time information on how full public bins are.

The system may be one wherein environmental sensors are installed tracking one or more of: rainfall, humidity, soil composition, topography, air pollution, atmosphere pressure, temperature, and sunlight.

The system may be one in which coupling the environmental sensor data with information about the landscape and weather prediction enables making smarter decisions about irrigation.

The system may be one in which sensor data on water levels in pipes is used to reduce the amount lost to leakage and prevent new leaks.

The system may be one in which embedding sensors in water pipes throughout a distribution network and connecting the sensor data to pump control systems is used to control water pressure in the water pipes.

The system may be one in which sensors include smart meters, which relay information about lights and buildings energy usage back to a central management system in order to efficiently allocate resources.

The system may be one in which lamppost sensors are installed on lampposts to monitor environmental conditions including one or more of: temperature, noise, and air quality.

The system may be one in which the lamppost sensor data is used to manage accidents, identify patterns in microclimates, or make predictions about vehicle and pedestrian traffic conditions.

The system may be one in which the system includes sensors in connected street lamps, enabling cities to enhance the control and performance of street lamps.

The system may be one in which sensors are used to determine if a parking space is available or not.

The system may be one in which parking space availability is viewable using an application on a mobile computing device, to guide the driver to an available parking spot.

The system may be one in which the system integrates with existing IoT networks into one (e.g. uniform) virtual network.

The system may be one including gateways and service providers, in which the system's software acts as a middleware between the gateways and the service providers.

The system may be one in which the data storage server includes master nodes, the master nodes in connection with each other.

The system may be one in which each master node performs transport recordation, invoice generation, billing generation, automatic or manual payments, and data storage.

The system may be one in which after transaction verification, if the Master Nodes approve, approval is sent back to the gateway.

The system may be one in which data is sent to a user web service, to a user app, to a vendor analytic tool, or to vendor software.

The system may be one in which the system is protocol agnostic.

The system may be one including a LR, in which the system's LR includes LoRaWAN.

The system may be one including a BLE, in which the system's BLE includes Bluetooth Low Energy.

The system may be one in which the system is used in supply chain applications including one or more of: Real-time fleet management; Cargo integrity monitoring; Optimized warehouse workloads; Inventory tracking & analytics; End-to-end visibility into delivery process; Smart labels; Predictive maintenance; Storage conditions control.

The system may be one in which the system is used to allow for a single product ecosystem: unlocking the potential to analyze the supply chain at every step.

The system may be one in which the system allows the possibility to integrate suppliers, deliveries, and end clients in a single ecosystem.

The system may be one in which the system includes aspects which are one or more of: Connected Assets; Connected Fleet; Connected Infrastructure; Connected Markets; Connected People.

The system may be one in which the system is used in a pharmacy supply chain solution.

The system may be one in which the system tracks every separate box containing a pharmaceutical product, and data is collected along the whole delivery route.

The system may be one in which the system crowdsources its infrastructure: data from sensors is transferred using smartphones of regular citizens or any compatible gateway.

The system may be one in which the infrastructure is provided by installing an app with the system's SDK, or installing a Gateway at a home.

The system may be one in which transportation sensors are installed in seats of metro cars & public transport, and transportation sensor information is used to enable a more even distribution of passengers within the metro car or in public transport.

The system may be one in which the system is used to manage break-ins or container openings, using breakable or multiple use sensors.

The system may be one in which the system is used to register trespassing into hotel/bar grounds, by using thin sticker beacons on alcohol bottles.

The system may be one in which the system is used to collect data on an amount of people currently occupying public spaces.

The system may be one in which an insurance tracker sensor is included in a sticker which is attached to a vehicle (e.g. a car); the insurance tracker sensor is used to gather and transfer data on vehicle usage.

The system may be one in which the gathered and transferred data includes one or more of: Number of days the vehicle was used; Intense speed up and slow down sequences, sharp turns and lane switches performed.

The system may be one in which the insurance tracker collects no personal data.

The system may be one in which sensors are installed on public transport vehicles, and smartphones positioned close enough to a public transport vehicle, or traveling inside a public transport vehicle, to transfer data from onboard sensors; data is transferred without requiring any additional actions from the smartphone's owner; the system includes BLE and the system's BLE uses the Bluetooth Low Energy technology supported by the smartphones.

The system may be one in which data types collected include one or more of: Number of passengers entering and leaving; Overall passenger numbers per route; Route and travel parameters.

The system may be one in which a 3G module is included on a public transport vehicle, to provide a LR gateway of the system.

The system may be one in which sensors are placed in villages/cities and on roads along a public transportation route.

The system may be one in which sensors include one or more of: Traffic counters; Pedestrian counters; Water usage counters or solar battery power fuel gauges.

The system may be one in which a transport uplink cycle is provided, in which the service provider's server sends data to master nodes at the data storage server; the master nodes store the uplink data; gateways request and receive the stored uplink data from the master nodes, and the gateways send the uplink data to devices registered at the service provider's server. This provides an advantage of an aspect of the first aspect of the invention.

According to a second aspect of these concepts, there is provided a method including the step of using a system of any aspect according to the first aspect of these concepts.

According to a third aspect of these concepts, there is provided a method of securely storing transactions and sensor data in a system, the system including a data storage server, a service provider's server, and a gateway, the service provider's server in communication with the data storage server, and the gateway in communication with the data storage server, the method including the steps of:
(i) the data storage server, the service provider's server, and the gateway registering as nodes in a blockchain system;
(ii) the data storage server generating first tokens;
(iii) the data storage server receiving a registration from the service provider's server, and issuing first tokens to the service provider's server, and receiving a first token from the service provider's server;
(iv) the gateway receiving sensor data from a device registered at the service provider's server, and the data storage server receiving the sensor data from the gateway;
(v) the data storage server issuing second tokens to the gateway after receiving the sensor data from the gateway;
(vi) the data storage server storing the received sensor data on the data storage server or on the service provider's server, wherein the sensor data is stored using the blockchain system, and
(vii) the data storage server storing token transactions for the first tokens and for the second tokens using the blockchain system.

The method may be one including the step of using a system of any aspect according to the first aspect of these concepts.

The above concepts may be combined with other aspects of the disclosures of this document.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A system including a data storage server, a plurality of service providers' servers, and a gateway including a transceiver configured to operate at a power level below 5.0 mW, the gateway programmed with an application, the service providers' servers in communication with the data storage server, and the gateway in communication with the data storage server,
wherein the data storage server is configured to generate first tokens, to receive registrations from the service providers' servers, and to issue first tokens of the generated first tokens to the service providers' servers, and to receive first tokens of the issued first tokens from the service providers' servers,
wherein the data storage server is configured to receive sensor data from the gateway, the gateway executing the application to receive the sensor data from a sensor, or from a plurality of sensors, via the transceiver, the data storage server configured to issue second tokens to the gateway after receiving the sensor data from the gateway,
the data storage server further configured to store the received sensor data on the data storage server or to store the received sensor data on a service provider's server of the plurality of service providers' servers, wherein the system is configured to store token transactions for the first tokens and for the second tokens, wherein the system is configured to store the sensor data using a blockchain system, wherein the system is configured to store the token transactions for the first tokens and for the second tokens using the blockchain system, and wherein the data storage server, the service providers' servers, and the gateway are registered nodes in the blockchain system,
wherein sensor data relating to the service providers' servers and transaction data associated with the service providers' servers are securely stored in the blockchain system.

2. The system of claim 1, in which the transceiver is configured to operate at a power level below 3.0 mW.

3. The system of claim 1, in which the transceiver is configured to operate at a power level below 1.0 mW.

4. The system of claim 1, in which the transceiver is a Bluetooth transceiver.

5. The system of claim 4, in which the gateway is configured to use Bluetooth mesh networking.

6. The system of claim 1, in which the gateway is a mobile computing device, a smartphone, a tablet computer or a laptop computer.

7. The system of claim 1, in which the gateway is a non-mobile device.

8. The system of claim 1, in which the gateway includes a further transceiver, or in which the gateway includes a further transceiver configured to operate at a power level above 50 mW.

9. The system of claim 8, in which the gateway is configured to communicate with the data storage server using the further transceiver, or in which the further transceiver is a cellular transceiver, for example a LPWAN transceiver.

10. The system of claim 1, in which the transceiver is configured to use advertising (beacon) one way communication from a sensor to the gateway, or in which the transceiver is configured to use a mesh Bluetooth protocol.

11. The system of claim 1, the system including a sensor.

12. The system of claim 11, in which the sensor sends a beacon advertising signal when it is not connected to the gateway; the gateway's application sets up a geofence zone to all low power (below 5.0 mW) sensors, so the gateway runs a part of the application code each time when the gateway enters a sensor advertising signal zone; this part of the code is responsible for data routing—so the gateway connects to the sensor, downloads the sensor data and sends the sensor data to the destination (eg. in the cloud).

13. The system of claim 11, in which the transceiver is configured to use two-way communication between the sensor which is trusted by the gateway, and the gateway, which is trusted by the sensor.

14. The system of claim 11, in which the sensor includes an ID relating to the system.

15. The system of claim 14, (i) in which the gateway checks the ID against a ledger of the system, wherein the system includes the ledger; or (ii) in which the gateway checks the ID against a ledger of the system, wherein the system includes the ledger, and in which the gateway checks a secure key in the gateway's internal memory, and all data sent through the gateway is end-to-end encrypted.

16. The system of claim 11, in which a user can't read the data until he has a necessary key for the sensor, or in which a sensor key is used for correct accounting of a sent data amount.

17. The system of claim 1,
(i) in which multiple Bluetooth sensors are connectable to multiple gateways acting as gateways to the sensor data destination; or
(ii) including Bluetooth sensors which include sensors in one or more of: Utility meters; Parking sensors; Water/gas leak detectors; Gunshot detectors; Air quality sensors; weather sensors; Attendance counters; Panic buttons; Public transportation trackers; Street lights; traffic lights; Home & office security sensors; Asset trackers; electricity meters; sun light/radiation meters; vibration sensors; or
(iii) in which the system includes multiple LPWAN gateways, and multiple LPWAN sensors connectable to the multiple LPWAN gateways; or
(iv) in which there is no need to pair a specific sensor with a specific gateway; or
(v) in which storage of sensor data is recorded within a common ledger, creating a transparent billing; or
(vi) in which the tokens are crypto-tokens; or
(vii) in which the system provides interoperable and transparent connectivity for cities, individual households and major enterprises alike.

18. The system of claim 1, including a plurality of gateways, the plurality of gateways in communication with the data storage server, each gateway including a transceiver configured to operate at a power level below 5.0 mW, each gateway programmed with an application, wherein the data storage server is configured to receive sensor data from the gateways, each gateway executing the respective application to receive the sensor data via the respective transceiver, the data storage server configured to issue second tokens to the gateways after receiving the sensor data from the gateways,
the data storage server further configured to store the received sensor data on the data storage server or to store the received sensor data on the service provider's server of the plurality of service providers' servers, wherein token transactions for the first tokens and for the second tokens are stored in the system.

19. The system of claim 18, (i) wherein the sensor data is stored using the blockchain system, wherein token transactions for the first tokens and for the second tokens are stored using the blockchain system, and wherein the gateways are registered nodes in the blockchain system; or (ii) in which the plurality of gateways include a plurality of LR gateways and a plurality of BLE gateways; or (iii) in which the gateways are arranged to receive the sensor data from a plurality of devices registered at the service provider's server of the plurality of service providers' servers.

20. A method of storing transactions and sensor data acquired using a transceiver configured to operate at a power level below 5.0 mW, in a system, the system including a data storage server, a plurality of service providers' servers, and a gateway, the gateway including the transceiver configured to operate at a power level below 5.0 mW, the gateway programmed with an application, the service providers' servers in communication with the data storage server, and the gateway in communication with the data storage server, the method including the steps of:
(i) the data storage server generating first tokens;
(ii) the data storage server receiving registrations from the service providers' servers, and issuing first tokens of the generated first tokens to the service providers' servers, and receiving first tokens of the issued first tokens from the service providers' servers;
(iii) the gateway executing the application to receive sensor data from a sensor, or from a plurality of sensors, via the transceiver which is configured to operate at a power level below 5.0 mW;
(iv) the data storage server receiving the sensor data from the gateway;
(v) the data storage server issuing second tokens to the gateway after receiving the sensor data from the gateway;
(vi) the data storage server storing the received sensor data on the data storage server or storing the received sensor data on a service provider's server of the plurality of service providers' servers;
(vii) storing the sensor data using a blockchain system, including storing the token transactions for the first tokens and for the second tokens using the blockchain system, and wherein the data storage server, the service providers' servers, and the gateway are registered nodes in the blockchain system; and
(viii) securely storing the sensor data relating to the service providers' servers and transaction data associated with the service providers' servers in the blockchain system.

* * * * *